(12) United States Patent
Andress et al.

(10) Patent No.: US 12,464,087 B1
(45) Date of Patent: Nov. 4, 2025

(54) DETERMINATION OF MEETING CONTENT FOR DISPLAY BY AN ENTERPRISE SYSTEM

(71) Applicant: Amazon Technologies, Inc., Seattle, WA (US)

(72) Inventors: Mark Andress, Shoreline, WA (US); Muhammad Tauseef Ulislam, Redmond, WA (US); Xiaoyu Miao, Palo Alto, CA (US); Yow-Hann Lee, Lakewood, WA (US); Gerard Guy Medioni, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 201 days.

(21) Appl. No.: 18/129,634

(22) Filed: Mar. 31, 2023

(51) Int. Cl.
*H04N 7/15* (2006.01)
*G06T 7/10* (2017.01)
*G06V 40/16* (2022.01)
*G10L 17/00* (2013.01)

(52) U.S. Cl.
CPC .............. *H04N 7/15* (2013.01); *G06T 7/10* (2017.01); *G06V 40/174* (2022.01); *G10L 17/00* (2013.01)

(58) Field of Classification Search
CPC .......... H04N 7/15; G06T 7/10; G06V 40/174; G10L 17/00
See application file for complete search history.

(56) References Cited

U.S. PATENT DOCUMENTS

| 11,523,049 B1 | 12/2022 | Tharakraj et al. |
| 2003/0016247 A1* | 1/2003 | Lai ........................ G06F 3/0481 715/764 |
| 2011/0246950 A1* | 10/2011 | Luna ................... G06F 3/04815 715/848 |
| 2017/0064004 A1* | 3/2017 | Volkmer ................... G06F 8/30 |
| 2020/0293260 A1* | 9/2020 | Fitzgerald ............. G06F 1/1605 |
| 2023/0281885 A1 | 9/2023 | Park et al. |
| 2024/0146779 A1 | 5/2024 | Ayanoglu et al. |
| 2024/0420400 A1 | 12/2024 | Iwaki |
| 2025/0173952 A1 | 5/2025 | Black et al. |

FOREIGN PATENT DOCUMENTS

| AU | 2019380367 B2 | 5/2021 |
| EP | 3070876 A1 | 9/2016 |

\* cited by examiner

*Primary Examiner* — Phung-Hoang J Nguyen
(74) *Attorney, Agent, or Firm* — Knobbe, Martens, Olson & Bear, LLP

(57) ABSTRACT

Techniques for a service provider network to manage a meeting between individuals located in a conference room with one or more other individuals remote from the conference room are discussed herein. An Enterprise system can implement one or more machine learned models to generate tiles that represent different individuals associated with a meeting. A same or different machine learned model can automatically arrange a series of tiles for display that, when presented collectively, promotes inclusiveness and attention for both in-room and remote participants of the meeting. The meeting management techniques can include determining which content to include on a display device based on evaluating changes in behavior of the meeting participants over time.

20 Claims, 11 Drawing Sheets

500

```
RECEIVE FIRST SENSOR DATA FROM A FIRST SENSOR IN A FIRST ENVIRONMENT AND SECOND SENSOR DATA
FROM A SECOND SENSOR IN A SECOND ENVIRONMENT THAT IS REMOTE FROM THE FIRST ENVIRONMENT
502
```

```
DETECT, BASED ON THE FIRST SENSOR DATA, A FIRST USER IN THE FIRST ENVIRONMENT
504
```

```
DETECT, BASED ON THE SECOND SENSOR DATA, A SECOND USER IN THE SECOND ENVIRONMENT
506
```

```
AUTHORIZE THE FIRST USER AND THE SECOND USER FOR ENTRY INTO A MEETING
508
```

```
ASSIGN, BASED ON THE AUTHORIZING, A FIRST MEETING IDENTIFIER FOR USE BY A FIRST DEVICE
ASSOCIATED WITH THE FIRST USER AND A SECOND MEETING IDENTIFIER FOR USE BY A SECOND DEVICE
ASSOCIATED WITH THE SECOND USER
510
```

CONFIGURE, BY A MACHINE LEARNED MODEL, A FIRST TILE TO REPRESENT THE FIRST USER AND A SECOND TILE TO REPRESENT THE SECOND USER,
512

INPUT, INTO THE MACHINE LEARNED MODEL, A FIRST SET OF IMAGES THAT DEPICTS THE FIRST USER AND A SECOND SET OF IMAGES THAT DEPICTS THE SECOND USER;
514

SELECT A FIRST IMAGE FROM THE FIRST SET OF IMAGES BASED ON A FIRST VIEWING ANGLE ASSOCIATED WITH EACH IMAGE IN THE FIRST SET OF IMAGES
516

SELECT A SECOND IMAGE FROM THE SECOND SET OF IMAGES BASED ON A SECOND VIEWING ANGLE ASSOCIATED WITH EACH IMAGE IN THE SECOND SET OF IMAGES
518

INCLUDE THE FIRST IMAGE AS A FIRST PORTION OF THE FIRST TILE AND THE SECOND IMAGE AS A SECOND PORTION OF THE SECOND TILE, THE FIRST TILE FURTHER INCLUDING A FIRST TEXT DESCRIPTION OF THE FIRST USER AND THE SECOND TILE FURTHER INCLUDING A SECOND TEXT DESCRIPTION OF THE SECOND USER
520

SEND THE FIRST MEETING IDENTIFIER, THE FIRST TILE, AND THE SECOND TILE TO THE FIRST DEVICE
522

SEND THE SECOND MEETING IDENTIFIER, THE FIRST TILE, AND THE SECOND TILE THE SECOND DEVICE
524

CAUSE THE FIRST DEVICE TO OUTPUT THE FIRST TILE AND THE SECOND TILE FOR DISPLAY ON A FIRST DISPLAY ASSOCIATED WITH THE FIRST DEVICE AND THE SECOND DEVICE TO OUTPUT THE FIRST TILE AND THE SECOND TILE FOR DISPLAY ON A SECOND DISPLAY ASSOCIATED WITH THE SECOND DEVICE
526

FIG. 5B

DETERMINATION OF MEETING CONTENT FOR DISPLAY BY AN ENTERPRISE SYSTEM

BACKGROUND

Cloud-based computing environments may provide many different types of services to subscribers, such as on-demand computing services, data-management services, software-execution services, application-hosting services, and various other types of services. Due to the ease of having the serverless computing environment provide and manage the computing infrastructure on behalf of subscribers, users continue to utilize cloud-based networks to provide and/or host services that are accessible over the Internet. These services are often managed, accessed, or otherwise interacted with using interfaces such as application programming interfaces (APIs). These APIs provide accessibility and usability to users of cloud-based services over the Internet.

Some services may provide a meeting space that connects people in different locations via a video link that captures some of the people in their respective locations. However, typical meeting spaces have a number of deficiencies that can lead to inefficient use of available computational resources and/or confusion by people trying to see, hear, or understand all the context available in the meeting space. The video link can present the wrong speaker or output unrelated audio which can lead to people not paying attention or contributing to the meeting space. Further, some of the multiple locations associated with the meeting space can lack a camera (or have a poorly placed camera) which can limit showing all of the people in the meeting space.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5A is a first part of a flow diagram of an example method for determining a tile to represent a user in a meeting.

FIG. 5B is a second part of a flow diagram of an example method for determining a tile to represent a user in a meeting.

DETAILED DESCRIPTION

Figure 1:
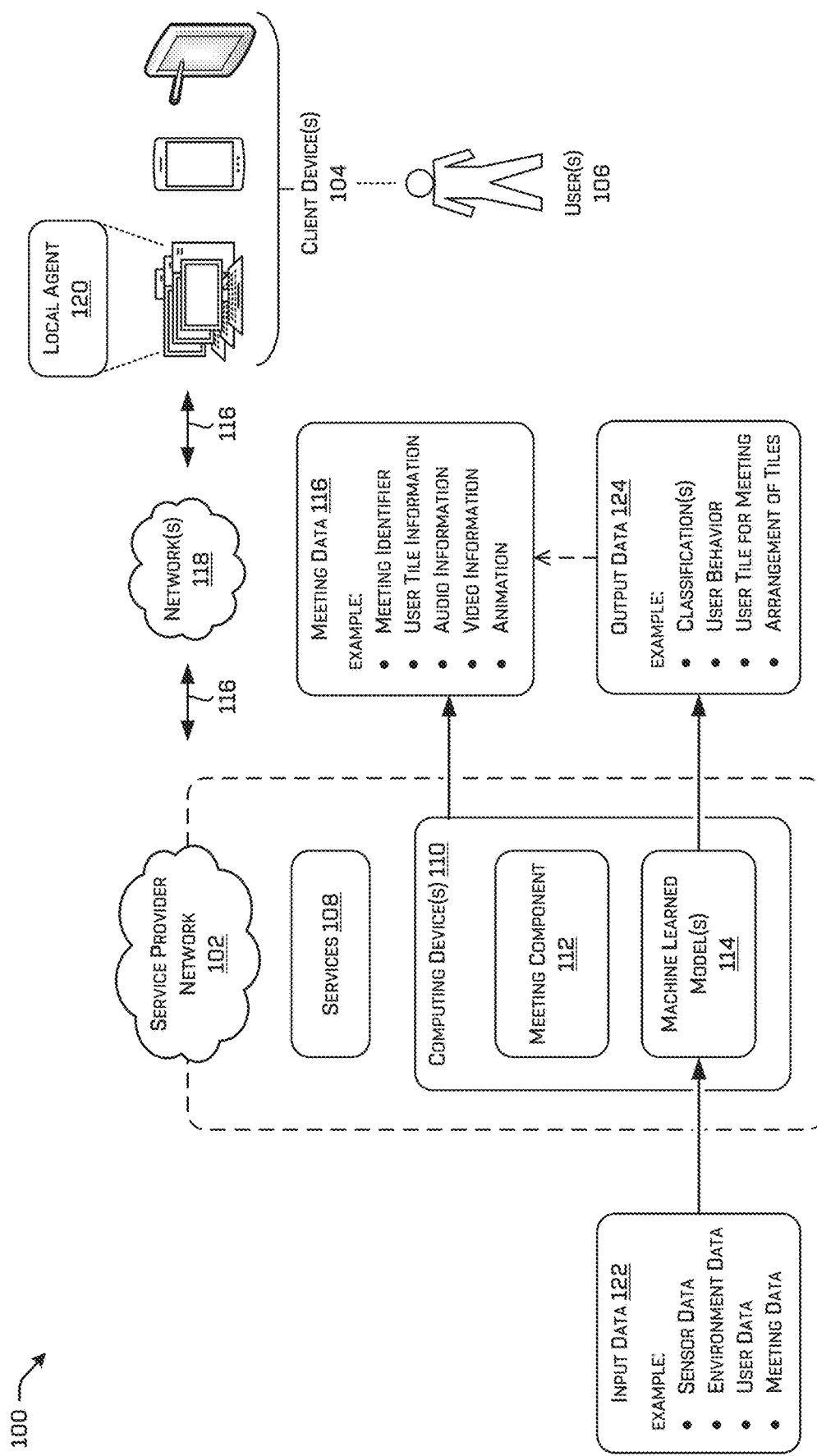
FIG. 1 illustrates a system-architecture diagram of an example environment in which a service provider network exchanges meeting data with one or more client devices associated with one or more users.

This disclosure relates to techniques for managing meetings between individuals located in a room with one or more other individuals remote from the room. For instance, an Enterprise system can implement one or more machine learned models to generate tiles that represent different individuals associated with a meeting (e.g., attendees, participants, and/or invitees of the meeting). A same or different machine learned model can automatically arrange a series of tiles for display that, when presented collectively, promotes inclusiveness and attention for both in-room and remote individuals attending the meeting. In some examples, the machine learned model(s) can determine an active speaker from among the participants, and use the active speaker information to choreograph a series of tiles for display that improves equity, productivity, and accessibility among the participants of the meeting.

The meeting management techniques can include determining which content to include on a display device based on evaluating changes in behavior of the meeting participants over time. Tiles output for display can change throughout the meeting (e.g., substantially real-time) based on an output(s) from one or more machine learned models that are trained to promote engagement among participants. For example, a first machine learned model can determine tiles to represent different individuals, while a second machine learned model can determine an active speaker (e.g., a participant leading the meeting at a particular time), and a third machine learned model can configure or modify tiles for display to promote inclusion among all participants of the meeting. Of course, in some examples the functionality of the machine learned models discussed herein can be performed by a single machine learned model and less than all the functionality discussed in association with the three machine learned models may be performed. For example, a machine learning model can be implemented to track sentiment or emotion of users over time based on sensor data (e.g., audio data, image data, etc.), generate tiles to represent different users including intelligent cropping from among multiple available frames (e.g., some having different viewing angles), and/or determine an optimal number of tiles and/or size and position of the tiles for display.

In some examples, the meeting management techniques can include configuring a physical location, such as a conference room, with various devices, displays, and/or sensors to capture participants in the physical location as well as to provide a "space" for a remote user to "appear" in the physical room. For instance, a speaker, display, and/or other device can be located in the location to represent the remote user to the other meeting participants. In various examples, a display device and a speaker can be positioned in the location (e.g., at a table) to present the remote user as if the remote user is in the location. The representation of the remote user can include a hologram or a tile on a display device, for instance. In this way, a remote user can be provided a "seat" at a table in the physical room. Of course, in examples without a table, the techniques can be used to display the remote user(s) relative to others such as in a group of people that are standing. Regardless of the implementation, the devices, sensors, etc. can be positioned to cause the remote user to have a presence in the location.

The Enterprise system (e.g., a server, an Enterprise Platform) can include functionality to initiate a meeting by passively detecting users (e.g., individuals, participants) in an environment based on sensor data received from a sensor. For example, a first sensor can be in a conference room (e.g., a first environment) and a second sensor can be in a room used by a user remote from the conference room. In various examples, the sensor(s) can represent one or more of: a microphone, a camera, a lidar sensor, a radar sensor, etc. The sensor(s) may be coupled to the environment and/or may be integral to a device associated with a user (e.g., a laptop, tablet, or mobile device for connecting to a meeting). In some examples, a machine learned model can receive sensor data as input and detect users in the respective environments, authorize the users for entry to a meeting by verifying their identities, and assign identifiers for each user to use to enter the meeting. By using passive techniques, a user can be identified upon entering a room and meeting identifiers can be generated responsive to authorizing each user. The meeting identifiers can be sent to the respective users for entry into the meeting independent of the user explicitly requesting entry to the meeting (e.g., without receiving a user input).

The systems and processes described herein can detect a user entering an environment (e.g., a room, a conference room, etc.) in multiple different ways. For instance, the environment may have one or more cameras (e.g., still image cameras, video cameras, etc.) that capture images or video of users entering the environment. The users may be identified using one or more facial recognition techniques using image data captured by the camera(s). In some embodiments, the images/video may also depict a badge, nametag, identification, etc. of the user, and the identity of the user may be determined based on this information. For instance, a badge number or name may be compared to a database of employees that includes names and or employee IDs. Moreover, sensor data resulting from a biometric scanner performing a biometric scan of users entering the environment may be compared to stored biometric data in order to determine an identity of the users. The biometric data may include fingerprints, facial data, voice data, palm or finger vein patterns, and so on. The environment may also include one or more motion detectors that detect movement within the environment, such as users entering, or moving around within, the environment. One or more devices located within the environment may detect a user device of a user (e.g., a mobile telephone, a tablet computing device, a laptop computer, etc.) as the user enters the environment. For instance, a Bluetooth® low energy beacon within the environment may detect the user device using Bluetooth® technology. In some instances, the beacon may determine that a user device is within a threshold distance from the beacon. WiFi-triangulation may be utilized to locate a user device within the environment, or a user device that is entering the environment, using cellular data associated with the user device. As referenced above, users may also be wearing, or otherwise carrying, a badge, card, etc. associated with an organization of the users and a sensor within the badge/card may be utilized to both detect that the users are within the environment and identify the users (based on unique codes/identifiers associated with the badges/cards). The users may also be detected to be entering or within the environment based on user interaction with corresponding user devices, such as a mobile application residing on the user devices, or calendar data associated with the users, the user devices, and/or the environment that is to host a scheduled meeting.

In some examples, a machine learned model can be configured to output a representation of the user that promotes engagement when presented on display devices associated with different users. The machine learned model can, for example, receive input data (e.g., sensor data, environment data, meeting data, etc.) and output a tile representing a window with an image or video of the user (i.e., depicting the user) and a portion of the environment of the user. In some examples, a sensor can change a setting and/or a position within the room to capture the user from another point of view. In some examples, multiple sensors can be included in an environment to capture different viewing angles of the user. The machine learned model can be configured to receive sensor data from the sensor(s) to determine which viewing angle of the user is associated with pre-determined criteria (e.g., a particular emotion, a level of engagement, etc.). In some examples, a movable sensor can change position in an environment to capture a desired viewing angle (e.g., a point of view that best captures a feeling or facial expression of the user). The machine learned model can modify an image represented by the sensor data by determining a region of interest around the user for including in a portion of a tile.

The meeting management techniques can include the Enterprise system implementing a machine learned model to determine how to display representations of different users. For instance, a machine learned model can receive, as input data, output data from another machine learned model that identifies an active speaker and/or from another machine learned model that generates a tile to represent the user. The machine learned model can, for example, determine an arrangement of the representations for presentation based at least in part on input data which can also include historical data associated with the participants (e.g., a pre-recorded voice profile unique to a user, behavior during a previous meeting, or behavior during an earlier time of a current meeting). In some examples, the machine learned model can determine a score indicating an emotional state or a level of engagement of a user in an image of the set of images, and compare scores for different viewpoints (to a threshold, one to another, and the like) to select an image (or portion thereof) for use in a tile. Additionally, or alternatively, the machine learned model can determine a score indicating an emotional state or a level of engagement for a tile, and compare scores associated with the tiles for determining a number of tiles to output and/or an arrangement of the tiles for output in a meeting window on a display device as part of the meeting.

The systems and techniques disclosed herein can manage a meeting by employing a server, computing device(s), and/or a databases(s), etc. that collectively receive, determine, generate, and/or format image data and audio data associated with the meeting. The server may, for example, implement a machine learned model trained to output a subset of available tiles that best represent different participants which may reduce network bandwidth requirements that may otherwise be used to determine, transmit, or present persons in a meeting. The techniques described herein can improve the quality or usefulness of a meeting by outputting data from one or more models that best represents a tone of the meeting while enabling more efficient use of resources (e.g., optimizing use of available network bandwidth and/or computational resources). In some examples, the techniques can be used to reduce an amount of data transmitted over a network in association with the meeting (e.g., tiles can be selected for presentation to evoke a pre-determined response by a user). By managing a meeting as described herein, tiles for different users can be configured to include one or more of: an image or video of the user, a chat window; a hand-raise control, a translation service to translate audio and output translated text, and the like. Additional details for generating, modifying, and/or arranging tiles representing different meeting participants are discussed throughout this disclosure including in relation to the figures below:

The Enterprise system can represent or otherwise utilize a cloud platform that provides or hosts various types of services (also referred to as backend service). For instance, backend services may include business-application services, financial-institution services, healthcare services, and so forth. Client devices often interact or access these backend services over a network, such as the Internet, using API calls that define an operation or interaction that the client device is requesting be performed. For example, an application or agent may be running locally on a client device to conduct a meeting, make a purchase, etc. Data associated with the cloud platform can be used as input data to one or more models as described herein.

In various examples, the Enterprise system can implement a machine learned model configured to analyze one or more of: posture, facial expression, mouth movement, eye gaze, audio volume, an orientation of a user (relative to another user or relative to the environment), etc. of different participants to determine a current behavior of the user prior to and/or during a meeting. A variety of input data can be used including data received from another service, component, server, memory, database, etc. associated with the Enterprise system including the aforementioned cloud platform. For instance, the input data can comprise data representing conditions of a room (e.g., sensor data representing ambient light, glare, background content and/or audio whether related or unrelated to the meeting, and the like). By way of example and not limitation, the machine learned model can apply a mouth movement algorithm to input data representing a user to identify an amount of mouth movement of the user for use in determining a tile, an active speaker, and/or a position or size of a tile for display.

The Enterprise system can employ a variety of different models to perform the techniques described herein. As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

Certain implementations and examples of the disclosure will now be described more fully below with reference to the accompanying figures, in which various aspects are shown. However, the various aspects may be implemented in many different forms and should not be construed as limited to the implementations set forth herein. The disclosure encompasses variations of the examples, as described herein. Like numbers refer to like elements throughout.

By using the techniques described herein, problems that typically cause distraction or loss of interest (e.g., not being able to see people in a meeting, delays between active speakers, or a pause by an active speaker, etc.) can be identified and mitigated by having expressions, viewpoints, audio, and the like selected for output that enable a participant to stay engaged in a meeting. In this way, a meeting having participants in various physical locations can include detail (e.g., output data from various models) that simulates having everyone in a single room and/or captures detail that would otherwise be lost (e.g., determines differences between facial expressions such as whether an expression indicates that a speaker is pausing to think or whether the speaker is expecting a response, and outputs tiles that capture such differences).

FIG. 1 illustrates a system-architecture diagram of an example environment 100 in which a service provider network 102 exchanges meeting data with one or more client devices 104 associated with one or more users(s) 106. As shown, the service provider network 102 comprises services 108 and one or more computing device(s) 110 that further comprise a meeting component 112 and one or more machine learned model(s) 114. In some examples, the computing device(s) 110 can be configured to output meeting data 116 for conducting a meeting. In some examples, the user 106 of the client device(s) 104 can interact with the service 108 of the service provider network 102 and/or provide input indicating desirable functionality for configuring a meeting. The machine learned model(s) 114 can receive a variety of input data 122 for processing, and determine output data 124 representing audio and/or video data for presentation as part of the meeting. For instance, the computing device(s) 110 can implement the meeting component 112 and/or the machine learned model(s) 114 to provide data usable to conduct a meeting in association with a meeting service. Though the meeting component 112 and the machine learned model(s) 114 are shown separately for discussion purposes, functionality associated with the meeting component 112 or the machine learned model(s) 114 can be included in the meeting component 112, the machine learned model(s) 114, or another component of the service provider network 102.

In some examples, the service provider network 102 may comprise clusters of managed servers stored in data centers located across geographic areas. The service provider network 102 may be a distributed network through which users (often customers) may interact via the client device 104 to manage or otherwise interact with services 108 provided by the service provider network 102. The service provider network 102 may be managed by a service provider, and may provide various types of services 108, such as an on-demand computing service, a message-queuing service, a managed-database service, a software-execution service, application-hosting services, business-application services, financial-institution services, and/or other services. The services 108 may be a collection of computing resources configured to instantiate VM instances, containers, network functions, etc., and to provide other types of computing resources on demand. Other applications for the services 108 may be to support database applications, electronic commerce applications, business applications and/or other applications. The services 108 may represent a managed message queuing service that enables users to send, store, and receive messages between software components at any volume without losing messages or requiring that other services 108 be available.

The services 108 described above, and any other services, may be provided in one particular implementation by one or more data centers operated by the service provider. As known to those skilled in the art, data centers are facilities utilized to house and operate computing resources, such as computer systems and associated components. Data centers also typically include redundant and backup power, communications, cooling, and security systems. The data centers might be located in geographically disparate regions, and might also be connected to various other facilities, such as co-location facilities, and various wide area networks ("WANs"), such as the Internet.

The computing resources associated with the services 108 can be provisioned and de-provisioned as needed in an automated fashion. For example, the service provider network 102 might be configured to instantiate a new instance of a computing resource, such as a VM instance, in response to an increase in demand for a network service or other condition. Other types of computing resources might also be provisioned and de-provisioned in a similar manner. Services 108 in the service provider network 102 might also provide functionality for automatically scaling and/or de-scaling the computing resources based upon demand for the resources and/or other factors.

In some examples, the user(s) 106 may interact with services 108 using the client device(s) 104. Generally, the client device(s) 104 may be any type of computing device capable of connecting to the service provider network 102 via a suitable data communications network 118 such as, but not limited to, a laptop or desktop computer, a tablet computing device, a server computer, a vehicle, or a mobile telephone, just to name a few: Administrative users employed by the operator of the service provider network 102, such as administrators managing the operation of the service provider network 102, might also connect with, manage, and utilize resources provided by the service provider network 102 in a similar fashion.

According to the techniques described herein, user(s) 106 of the service provider network 102 may subscribe for an account with the service provider network 102 to utilize the computing infrastructure (e.g., computing resources in data centers) supporting the services 108 (e.g., memory, processing power, auto-scaling, networking and content delivery, etc.) provided for and managed by the service provider network 102. The service provider operating the service provider network 102 may charge a fee for utilization of the computing resources to a subscriber that have computing resources provisioned to support and use the services 108.

Generally, the user(s) 106 may interact with the client device(s) 104 to receive or employ a service 108. The user(s) 106 may be one or more of individual users, groups of users, organizations, businesses, or other entities that interact with the service provider network 102 via respective client device(s) 104. Additionally, the client device(s) 104 may have various components, algorithms, software, client applications, and so forth, to perform authentication methods with identity service providers. For instance, the client devices 104 may have a software client for communicating using various network protocols, including cryptographic network protocols, such as FTPS protocol STP protocol, Web Authentication (WebAuthn) protocol, Universal $2^{nd}$ Factor (U2F) protocol, Universal Authentication Framework (UAF) protocol, and/or any other authentication protocol.

To utilize the services 108 or to otherwise provide input to the service provider network 102, the user 106 may access a local agent 120 running on the client device 104, where the local agent 120 can represent software that is associated with the services 108. The local agent 120 may also, or instead, represent a user interface having one or more controls (or input controls) for the user 106 to provide input usable by the meeting component 112 to generate, update, or otherwise manage a meeting with the user 106 and one or more other users (in a same or different location). For instance, the user 106 can provide input to one or more controls of the local agent 120 to indicate preferences related to a meeting on a display device of the client device(s) 104.

In some examples, the meeting component 112 can generate or configure a communication channel, a control plane, and/or a data plane for each participant of the meeting based at least in part on receiving data (from the client device(s) 104, a database, or memory) indicating preferences of the user. In some examples, the meeting component 112 can receive sensor data as input and use the sensor data to detect users in the respective environments, authorize the users for entry to a meeting by verifying their identities, and assign identifiers for each user to use to enter the meeting. Generally, data output by the meeting component 112 and/or the machine learned model(s) 114 can be referred to as the meeting data 116. The meeting data 116 can represent, for example, user tile information, a meeting identifier, audio information, video information, an animation, or other data usable for presenting data in association with the meeting. In various examples, the meeting data 116 can be determined based at least in part on an output from the machine learned model(s) 114 (e.g., the output data 124) (as indicated by a dashed arrow in in FIG. 1).

In some examples, the service provider network 102 can represent or otherwise be part of an Enterprise system and the computing device(s) 110 can represent a server that is configured to initiate a meeting and manage meeting content for presentation on a display device throughout the meeting. For example, the computing device(s) 110 can employ the machine learned model(s) 114 to generate a tile to represent an individual associated with a meeting, arrange tiles for display to enhance attention to participants, documents, or other content of the meeting (e.g., relative to not generating a tile). In some examples, the machine learned model(s) 114 can determine an active speaker from among multiple users by analyzing audio amplitude, speaker location, known voice identities, and the like. The machine learned model(s) 114 can also or instead determine arrangement data for arranging tiles for display that improves equity, productivity, and accessibility among the participants of a meeting (relative to not implementing the techniques, for example).

In some instances, the meeting component 112 may access a database (not shown) that stores data associated with a user (e.g., a user voice file, user preferences, etc.) and/or stores historical meeting data usable for managing a meeting as described herein. For instance, the meeting component 112 may query the database to identify a voice profile of a user for determining a current speaker of the meeting and/or access meeting data associated with a previous time for analysis or training the machine learned model(s) 114.

Generally, the machine learned model(s) 114 can output a discrete representation for each person in a meeting based on sensor data captured by a sensor proximate the person. The discrete representation can comprise an image or video of the participant and may be referred to herein as a tile. In other words, the tile can represent a window with an image or video of the user, text information (e.g., a name), a portion of the environment of the user (e.g., a background), and/or vision or audio based effects added to the user and/or the background). The machine learned model(s) 114 can be trained to output a tile having characteristics that evoke a feeling or emotion when presented on a display device for viewing by a meeting participant. In some examples, tiles output for display can change in real-time based on an output(s) from one or more machine learned that are trained to promote engagement among participants. For example, machine learned model(s) 114 can analyze one or more of: posture, facial expression, mouth movement, eye gaze, position, orientation, and audio volume of different participants, just to name a few; to determine a current behavior of the user prior to and/or during a meeting.

The machine learned model(s) 114 can be configured to evaluate changes in behavior of the meeting participants over time (e.g., participants in a same room or across different geographical locations) and use the behavior(s) to generate a tile or arrangement of tiles. For instance, a machine learning model can predict an emotion or behavior of various users in an image (or multiple images), and determine characteristics (e.g., aspect ratio, viewing angle, saturation, etc.) based on audio and/or video information in sensor data. For example, the machine learned model(s) 114 can apply an algorithm to select a frame from among multiple available frames (e.g., frames captured at different times or different frames associated with a same time) having a viewing angle or other characteristic that best captures a particular user. The selected frame can be used to represent a user in a tile, or the selected frame can be modified (e.g., changed to accentuate a color, sound, add an artistic effect, or feature of the image) prior to being included as part of the tile.

In various examples, the machine learned model(s) 114 can determine a number of tiles to output for display at a particular time based at least in part on a number of participants, audio characteristics (e.g., an amount of amplitude for a speaker, a change in amplitude over time, etc.), and the like. For example, an arrangement of tiles can be limited to a threshold number of tiles that a machine learned model identifies as an optimal number of tiles (given the size of each tile) to potentially cause a change in user behavior (e.g., increased attention over time). The threshold number of tiles can be based on a meeting window size on a display device, a number of attendees, or other factors.

The machine learned model(s) 114 can receive a variety of different types of input data to implement the techniques described herein. For example, the input data 122 can include, but is not limited to, one or more of: sensor data from one or more sensors, environment data (e.g., features such as ambient light, glare, etc.), user data (e.g., a user profile, voice data, etc.) and/or meeting data usable for conducting a meeting. In various examples, the machine learned model(s) 114 can modify an image represented by the sensor data by changing a size or appearance (e.g., cropping a portion of the user, modifying a color, size, viewpoint, etc.) for inclusion in a tile.

The output data 124 from the machine learned model(s) 114 can represent a classification (e.g., is a particular emotion present in the image), a behavior of the user(s) 106 (e.g., a current emotional state or level of interest, etc.), an indication of an active speaker (e.g., a speaker discussing content related to the meeting), tile information associated with multiple users, instructions for animating, arranging or otherwise presented the tiles. For instance, the machine learned model(s) 114 can determine an arrangement of tiles based at least in part on input data which can also include historical data associated with the participants (e.g., a pre-recorded voice profile unique to a user, behavior during a previous meeting, or behavior during an earlier time of a current meeting). In some examples, the machine learned model(s) 114 can determine a score indicating an emotional state or a level of engagement of a user in an image of the set of images (each image can be from a same or different time), and compare scores of each image (to a threshold, one to another, and so on) to select an image for use in a tile (e.g., having a highest interest score, emotion state score, etc.).

In some examples, the machine learned model(s) 114 can determine a score indicating an emotional state or a level of engagement for a tile. That is, a tile can be generated or arranged for display based on different scores as noted herein. In examples when the tile is assigned a score, the "tile score" can be used for determining how to arrange the tiles relative to one another, or selecting a tile from among multiple available tiles (or a same or different user). The tiles scores may also or instead be used for determining a number of tiles to output, an arrangement of the tiles relative to one another for output in a widow of a display device to represent the meeting, and the like. For example, less than all available tiles may be arranged for output in a window representing the meeting based at least in part on the score assigned to each respective tile. Further discussion of functionality provided by a machine learned model(s) can be found throughout this disclosure including in FIGS. 2 and 3.

By way of example and not limitation, the computing device(s) 110 can be configured to detect users entering or occupying a location, authorize the user(s), and send meeting credentials for entering a meeting to the user(s) free of an explicit input from the user (e.g., a window can be presented to the user(s) independent of the user clicking on a link to the meeting). A same of different model can determine and arrange tiles for presentation based on analyzing current behavior of the users. Using the techniques described herein, users are presented with tiles that aim to keep all users, whether located in a same room or located remotely, engaged. Instead of a single image of a user being presented throughout the meeting to capture the user over time, the computing device(s) 110 can select or otherwise generate different camera angles, images, or videos that change sufficiently over time to maintain or increase user participation in the meeting.

The computing device(s) 110 can be implemented to output tiles of different users on different devices when a user enters a room (e.g., existing users can automatically receive a new tile while the new user can receive an initial set of tiles). In some examples, tile arrangements for different users are dynamically updated over time with consideration to both historical user behavior, current user behavior, and/or predicted user behavior (occurring in a previous meeting or current meeting). The techniques described herein enable a user to simply enter a room and automatically receive meeting content that is specific for each user (on a personal device or device at a specific location within the room (e.g., a tablet in front of each person in a large room, for example). Further, the techniques can be used during the meeting to determine when to change meeting content, tiles, and so forth.

Figure 2:
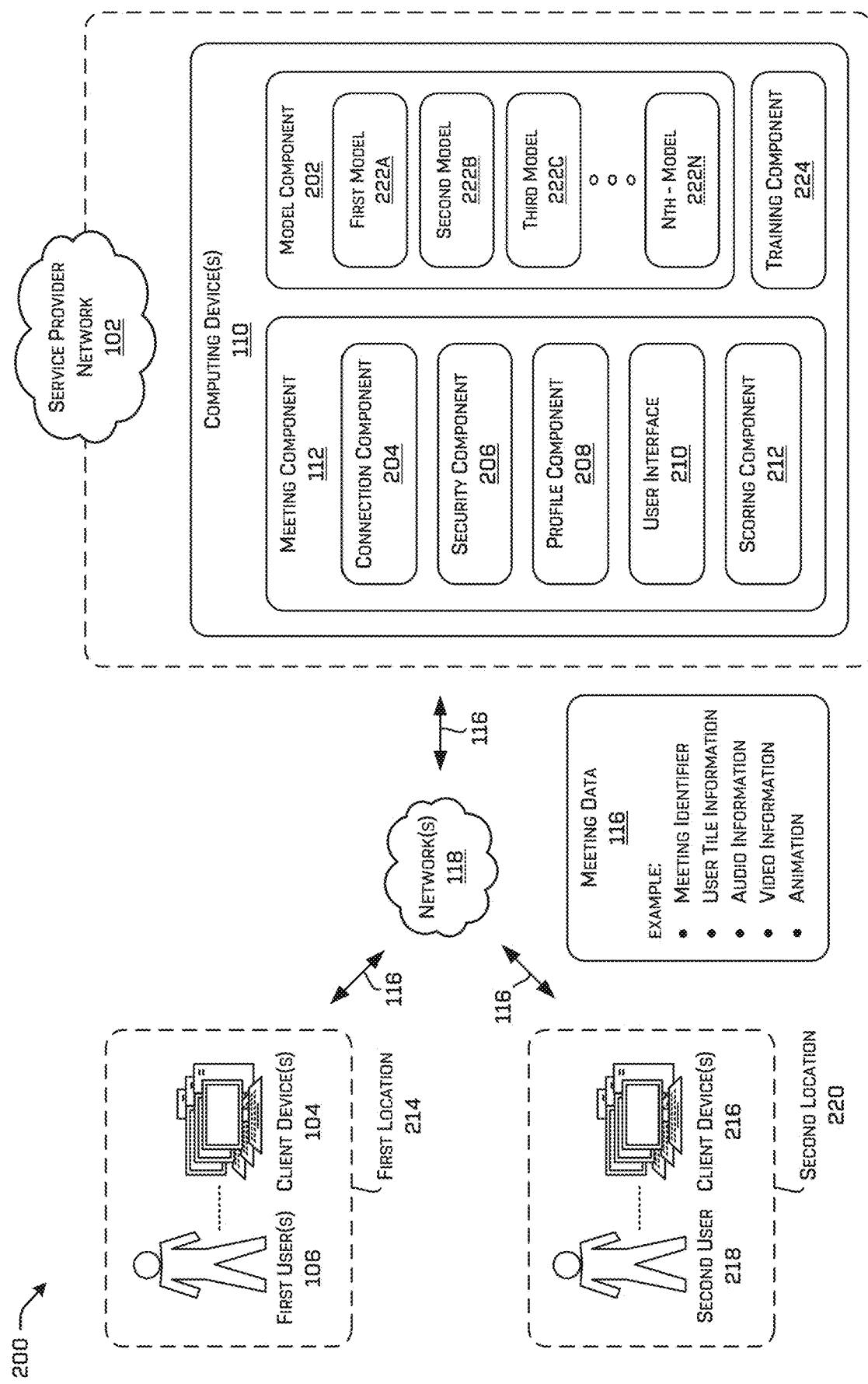
FIG. 2 illustrates a diagram of an example service provider network implementing example components to configure a meeting.

FIG. 2 illustrates a diagram 200 of an example service provider network implementing example components to configure a meeting. For example, the service provider network 102 can implement the computing device(s) 110 and the meeting component 112 of FIG. 1. As shown in FIG. 2, the computing device(s) 110 comprises a model component 202 and the meeting component 112 that further comprises a connection component 204, a security component 206, a profile component 208, a user interface 210, and a scoring component 212. Though depicted in FIG. 2 as separate components of the meeting component 112, the functionality associated with the connection component 204, the security component 206, the profile component 208, the user interface 210, and/or the scoring component 212 can be included in a different component of the service provider network 102 or the computing device(s) 110. In some instances, the components described herein may comprise a pluggable component, such as a virtual machine, a container, a serverless function, etc., that is capable of being implemented in any service provider network 102 and/or in conjunction with any API gateway.

The diagram 200 further depicts the meeting data 116 being exchangeable with the client device(s) 104 associated with a first user 106 at a first location 214 and client device(s) 216 associated with a second user 218 at a second location 220. For example, the meeting component 112 can configure meeting data for the client device(s) 104 and the client device(s) 216 that is specific for each respective user (e.g., the first user 106 may be speaking or otherwise paying attention and receive a first set of tiles representing participants and the second user 218 may be presented with a different set of tiles that are configured to cause a change in state of the second user 218). The second location 220 can be a separate area of a single physical room with first and second locations or another room separate from the first location 214 (e.g., a user in a room remote from a physical location such as a conference room).

As shown in FIG. 2, the model component 202 include one or more models, such as a first model 222A, a second model 222B, up to an Nth model 222N (collectively "models 222"), where N can be any integer greater than 1. The models 222 may be stored on, or otherwise accessible by, memory associated with the computing device(s) 110. The models 222 may represent machine learned models, statistical models, heuristic models, or a combination thereof. For example, the first model 222A can represent a machine learned model trained to determine a user representation (e.g., a tile, visual representation, image data, data, and the like) that evokes a response from another user (e.g., improves attention and/or participation over time) while the second model 222B can represent a machine learned model trained to output an arrangement of tiles (specific for each user) that captures a tone of the meeting that causes engagement. The third model 222C can be a statistical model that compares scores (of a user, a tile, or arrangement of tiles) indicating a level of emotion or attention one to another, and/or compares scores to a score threshold. In various examples, functionality associated with the models 222 can be included in another component of the computing device(s) 110 and/or in another component or computing device associated with the service provider network 102. In some examples, the model component 202 can represent the machine learned model(s) 114 (or functionality thereof).

In some examples, one or more sensors (not shown) can be in the first location 214 and additional sensor(s) can be in the second location 220. In some examples, the computing device(s) 110 can modify settings associated with a sensor to capture images of different quality, aspect ratio, viewing angles, and the like. For example, a single image sensor can capture different images of one or more users in an environment (e.g., the first location 214 or the second location 220). Alternatively, multiple sensors (e.g., an audio sensor, a first image sensor, a second image sensor, etc.) can be used in a respective location to capture data representing an environment of a user at various times. In some examples, a movable sensor can change position in an environment to capture a desired viewing angle that is associated with an optimal attention or predetermined emotion.

As mentioned, sensor(s) in one or more locations can change position within the room (from a first position to a second position) to capture different data associated with the user (e.g., capture the user from another point of view). In some examples, multiple sensors can be included in an environment to capture different viewing angles of the user simultaneously without requiring that the sensor change location. For example, a room (e.g., a conference room hosting a meeting) can be equipped with multiple sensors sufficient to capture one or more images of each participant in the room. In this way, a user in the room can be highlighted or included in a tile to remote users thereby avoiding scenarios in which a user speaks but is unable to be easily seen due to the number of people or a size of a room. In some examples, the sensor can represent one or more of: a microphone, a camera (e.g., RGB, IR, intensity, depth, time of flight, etc.), a lidar sensor, a radar sensor, just to name a few: The sensor(s) may be coupled to a physical location (e.g., the first location 214 or the second location 220) and/or may be integral to a device associated with a user (e.g., the client device(s) 104, the client device(s) 216).

In some examples, the meeting component 112 and/or the model component 202 (or models thereof) can receive sensor data as input data for processing. For example, the models 222 can be configured to receive sensor data from the sensor(s) to determine a tile to associate with a user, arrange tiles for display, identify an active speaker, and the like. In some examples, sensor data can be received by the meeting component 112 prior to a meeting beginning, such as when the user enters the location for use in detecting users in the respective environments (without the user necessarily knowingly positioning themselves in front of a sensor), authorizing the users for entry to a meeting by verifying their identities, and assigning identifiers for each user to use to enter the meeting. In this way, the meeting component 112 can employ one or more of the models 222 to perform passive techniques that enable users to be identified upon entering a room and receive meeting identifiers responsive to authorizing each user. In various examples, the meeting identifiers can be sent to the respective users for entry into the meeting independent of the user explicitly requesting entry to the meeting (e.g., based on the passive techniques).

In some examples, the meeting component 112 can be configured to receive sensor data representing a set of images and select an image from the set of images based on some criteria that optimizes a "tone" of the meeting. For example, the meeting component 112 can apply one or more algorithms to evaluate attributes of a user to output an indication of different emotional states of the user. A tile for a user can include the selected image that captures a particular emotion, for example (e.g. happy, sad, anticipation (such as when wanting to join a conversation), attentive, inattentive, angry, etc.). A combination of tiles can be output by the meeting component 112 to enable participants to "feel" as if they are all in a same room. In various examples, the selected image can be modified to change a size or appearance of the user for inclusion in the tile. The model component 202 can, for example, modify an image represented by the sensor data by cropping a portion of the user for including in a portion of a tile. The selected image (whether or not modified) can be included as a tile (or portion thereof) that represents the user in a window presented as part of the meeting.

By way of example and not limitation, the meeting component 112 and/or the model component 202 (or models thereof) can generate a representation of the second user 218 for output at the first location 214 by a display system (e.g., a device, a sensor, a display, or the like). In some examples, the representation of the second user 218 can be output by the display system that is positioned in the first location 214 relative to the first user(s) 106. For example, the display system can cause a tile, an image, a hologram, or other representation of the second user 218 to be presented on a device positioned between the first user 106, another user in the first location 214, another remote user in a third location, and so on. In an example that includes a table in a conference room, the meeting component 112 and/or the model component 202 (or models thereof) can generate a representation of the second user 218 for presentation at a position adjacent the table. In some examples, a representation of the table can be output in association with tiles for the participants of a meeting on different displays in the first location 214 and/or in the second location 220.

In various examples, a machine learned model associated with the model component 202 can be trained to detect, analyze, and otherwise interpret changes in a user's behavior, position, posture, or participation over time. In some examples, the machine learned model can output data for display that causes a particular user to increase attention relative to content presented in association with the meeting (e.g., by customizing tiles that evoke excitement or interest). Additionally, or alternatively, changes in a user's behavior, position, posture, or participation over time can be used by a same or different machine learned model to predict a behavior of the user in the future. In such examples, the meeting component 112 can determine content (e.g., tiles, animations, sound, etc.) associated with the meeting for presentation based at least in part on the predicted user behavior.

Different users can receive different meeting data 116 from the service provider network 102 including receiving tiles tailored for an assessed behavior or emotion of a particular user. For example, the first user 106 can receive a different number, size, or appearance of tiles for presentation than the second user 218. In other words, the computing device(s) 110 can transmit different meeting data to the client device(s) 104 and the client device(s) 216.

The connection component 204 can, in some examples, determine a communication channel usable by various entities, applications, or components to exchange data in association with a meeting over the network(s) 118. For example, the connection component 204 can initiate and maintain access to a window for output on a display device that includes tiles representing individuals as well as other interactive content or controls (e.g., a chat portion, controls to indicate an interest to speak, and the like). In one specific example, the connection component 204 can determine a device identifier usable by a client device of a user for entering into a meeting (e.g., a virtual meeting space between two physical locations or two separate locations within a same physical location). In some examples, the connection component 204 can identify an Application Program Interface (API) for exchanging the meeting data 116.

Generally, the security component 206 can operate to establish and maintain secure transmissions with authorized users and services. The security component 206 can represent functionality to secure the meeting data 116 before, during, and/or after a meeting (e.g., sending a communication, receiving a communication, storing meeting data for later access, etc.). For example, the security component 206 can be configured to determine a secure protocol, a security key, or other security information for communicating the meeting data 116 between components of the computing device(s) 110, components or services of the service provider network 102, various client devices, or a combination thereof. The security component 206 can, for example, validate a security key associated with a communication, test operation of the meeting, and so on, to secure communications associated with the meeting data 116.

The profile component 208 can be configured to store, access, or update user data associated with a user of a client device. For example, the profile component 208 can store user data describing user preferences regarding a meeting, authentication information, and/or a voice file comprising voice data uniquely identifying the user relative to other users, just to name a few. In various examples, the profile component 208 can verify user credentials or use a key or other authentication technique to validate an identity of the client device(s) 104 or the client device(s) 216 (or user thereof). The profile component 208 can output data indicating authorized users to another component, such as the communication component 204 for sending meeting identifiers to various client devices as discussed herein.

Generally, the user interface 210 represents functionality for the service provider network 102 to interface with a user of a device via one or more programmable controls that convey information and/or optionally receive input. In some examples, the user interface 210 can cause data to output on a display device of the client device(s) 104 and/or the client device(s) 216 to enable a meeting between users in different environments. The user interface 210 may also present options (selectable controls, interfaces, and the like) for a user to initiate a meeting, manage user preferences, or otherwise receive the meeting data 116 to conduct the meeting. Outputs from various components or models can be presented in respective user interface to implement the techniques described herein.

In some examples, the user interface 210 can be configured to present data associated with another service of the service provider network 102. For example, the user interface 210 can include a portion for presenting messages associated with a message service (e.g., a message window or pop-up window in the user interface for outputting text, image, and/or video message data received from the message service). The user interface 210 can also or instead present controls to receive an input to share a document or screen image output on a client device of a user, among other features. The user interface 210 can, in various examples, be configured to output tiles for different users and one or more of: an image of the user, a video of the user, a chat window, a hand-raise control, a translation window to present translated audio, a control to schedule tasks, notifications, scannable codes or images to access data, and the like.

The scoring component 212 can be configured to determine a score indicating a level of engagement and/or a level of attention for one or more of: a user represented by sensor data, a tile, and an arrangement of tiles. For example, sensor data can represent images of a user at a current time (e.g., images having different image quality or viewing angles between the image sensor and the user) or images of the user over a time period (a first image representing a first time and a second image representing a second time) can be evaluated by a machine learned model to determine a score indicating an emotional state or a level of engagement of the user (e.g., the first user 106, the second user 218, etc.). The models 222 may, for example, analyze posture, a facial expression of one or more users represented by the sensor data to determine the emotional state or the level of engagement of the user(s). For example, a machine learned model can be trained to output an emotional state or attention level of the user based on analyzing posture, eye, mouth, or other facial or body features of the user.

The scoring component 212 can implement a machine learned model (e.g., the first model 222A) to determine a score indicating a level of engagement and/or a level of attention associated with a tile (e.g., a "tone" generated by viewing the contents of the tile). A score for a tile can be determined based at least in part on analyzing characteristics of the tile including how a user, background features, settings associated with capturing the image (e.g., saturation, focus, aspect ratio, etc.). For instance, the level of engagement and/or a level of attention associated with the tile can reflect an emotion of level of attention with consideration to how ambient light, a user, and other content evokes a particular emotion. The score of a tile can also or instead be based on a score associated with the user (also referred to as a user score) from another machine learned model as noted herein. For instance, the user score can be used as a weighted input to a model that determines a tile score. In this way, the user score indicating that a particular user is or is not attentive (or other emotion or state) can be considered when determining the level of engagement and/or a level of attention associated with the tile.

In some examples, the model component 202 and/or the scoring component 212 can determine a score (of a user, tile, and/or arrangement of tiles) based at least in part on applying one or more of: a sentiment tracking algorithm that determines sentiment of the user, a gaze algorithm to track where a user is looking, a mouth movement algorithm to detect a mouth position or change in mouth position over time, or another technique to output an indication of an emotion or set of emotions exhibited by the user.

In various examples, a machine learned model can receive, as input data, first sensor data from a first sensor in a first environment, second sensor data from a second sensor in a second environment, and two or more tiles representing a respective user in each environment. In such examples, the machine learned model can determine a first score indicating an emotional state or a level of engagement of a first user in the first tile and a second score indicating an emotional state or a level of engagement of a second user in the second tile. The machine learned model can perform one or more of: comparing, as a first comparison, the first score to the second score: or comparing, as a second comparison, the first score and the second score to an attention threshold value. In such examples, the machine learned model can determine arrangement data representing a size and a position of the first tile and a size and a position of the second tile for display based at least in part on the first comparison or the second comparison. The arrangement data can include animations, sound effects, or other modifications to video or audio data captured in associated with the sensors.

In various examples, the model component 202 can comprise, for example, a machine learned model to identify speaker data indicated a current speaker from among multiple users in one or more environments. The speaker data can be based at least in part on the machine learned model implementing a variety of techniques including but not limited to applying a mouth movement detection algorithm to determine an amount of mouth movement by the users or applying an audio amplitude analysis algorithm to determine a peak amplitude of audio associated with the users. In some examples, the profile component 208 can provide voice profile data for use by the machine learned model to verify a speakers identity, determine a nominal volume (e.g., speaking below a threshold amplitude can indicate the speaking is unrelated to the meeting conversation). The model component 202 can send the speaker data to another component or model such as a machine learned model configuring to generate the first tile or the second tile, or a machine learned model for arranging the first tile relative to the second tile on the first display device or the second display device.

In various examples, an output from the model component 202 and/or the meeting component 112 can, responsive to being transmitted to a client device, cause the client device to output the first tile and the second tile automatically and without input from a user. For example, tile data can be generated and sent to a client device for presentation, and be output for display, responsive to configuring the first tile and the second tile.

The model component 202 can also or instead determine a number of tiles to output during the meeting to optimize attention and participation of the first user and the second user by comparing a number of available tiles to a tile threshold value that optimizes a presentation with consideration to how many tiles are presented (and expected to be digested by a user while also maintaining or increasing user attention). The meeting component 112 can configure the meeting to include the first tile, the second tile, and one or more additional tiles associated with additional users in accordance with the threshold number of tiles.

In some instances, the training component 224 can include functionality to train a machine learning model to output a classification for a person in an image and/or an image as a whole. For example, the training component 224 can receive a set of images (e.g., one or more images) that represent different user positions, facial expressions, postures, etc. in an environment for a period of time. At least a portion of the set of images can be used as an input to train the machine learning model. As a non-limiting example, a first set (e.g., 3, 4, 5, or more) of images may be input into the machine learned model. A second set of images (or attribute information associated therefrom—e.g., by extracting attributes from the images) may be used as ground truth for training the model. Thus, by providing images of users in an environment, the training components 224 can be trained to output behaviors (e.g., emotion, attention, gaze, mouth movement, audio information, etc.), as discussed herein.

In some examples, the computing device(s) 110 can implement the training component 224 to analyze the sensor data to determine one or more labels for images, tiles, tile arrangements, and/or for user(s) in the images. In some examples, ground truth behaviors of the user over a time period may be determined (either hand labelled or determined by another machine learned model) and such ground truth positions may be used to determine an actual level of attention, or other behavior, of the user (e.g., is the user paying attention, etc.). In some examples, corresponding image data may be input into the model to determine data (e.g., attributes, classifications, behaviors, etc.), and a difference between the determined data and the actual attributes, classifications, behaviors, etc. may be used to train the model.

In some examples, the training component 224 can include training data that has been generated by one or more machine learned models described herein. For example, training data can represent determinations from the machine learned model(s) (e.g., speaker data, tile data, arrangement of tiles data, and so on), to provide additional training examples. Third-party labeled training data can also or instead be used for training in various examples.

Figure 6:
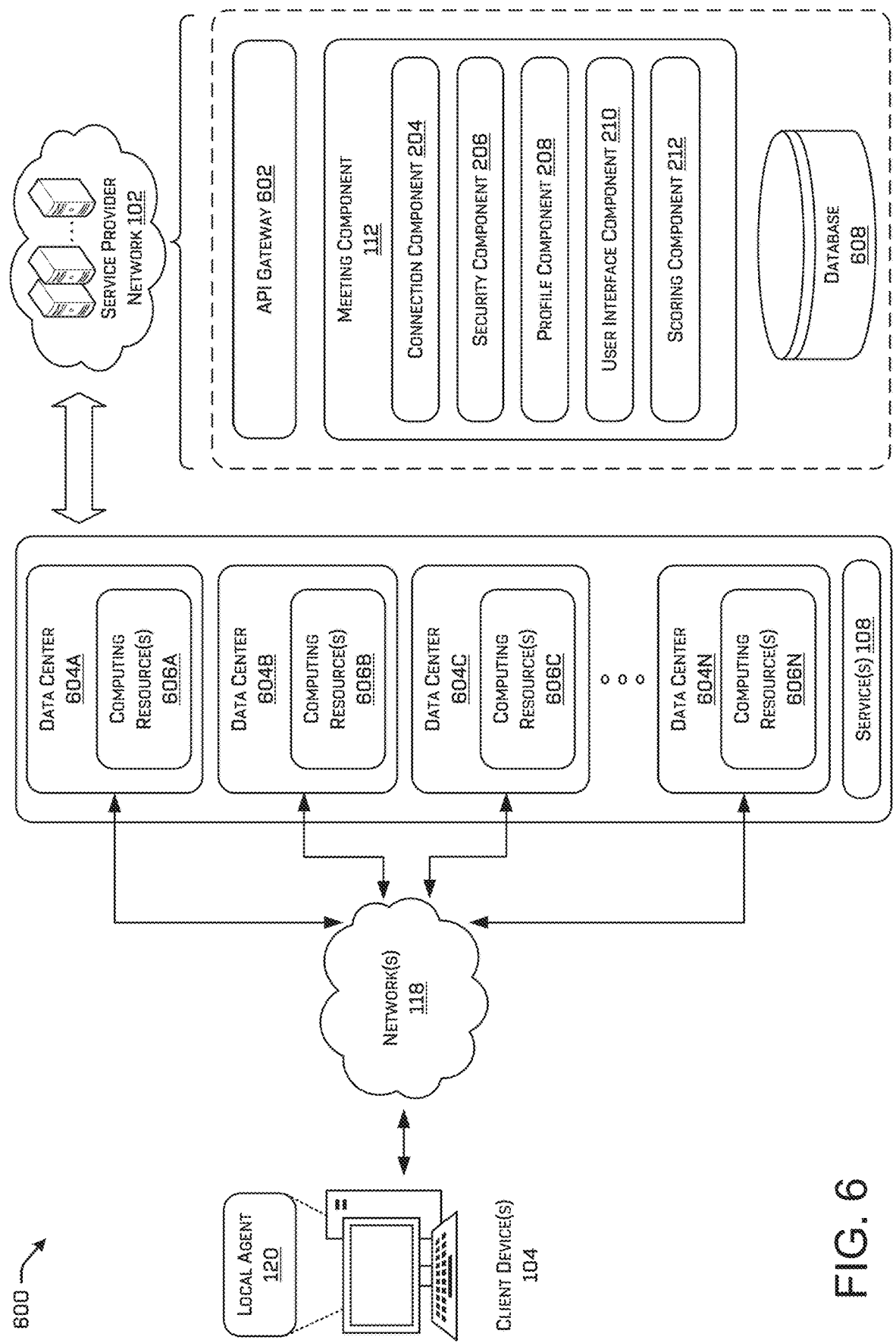
FIG. 6 illustrates a system and network diagram of an example operating environment that includes a service provider network for implementing the techniques described herein.

In various examples, one or more components (e.g., the profile component, etc.) can include or access a database (e.g., the database 608 of FIG. 6 or a database local to the computing device(s) 110), a container registry, a memory, or other storage device to store meeting data (e.g., message data, user data, environment data, sensor data, and other data usable for establishing and maintaining a meeting). Some stored message data can be used as input data (or training data) into a model as described herein.

Figure 3:
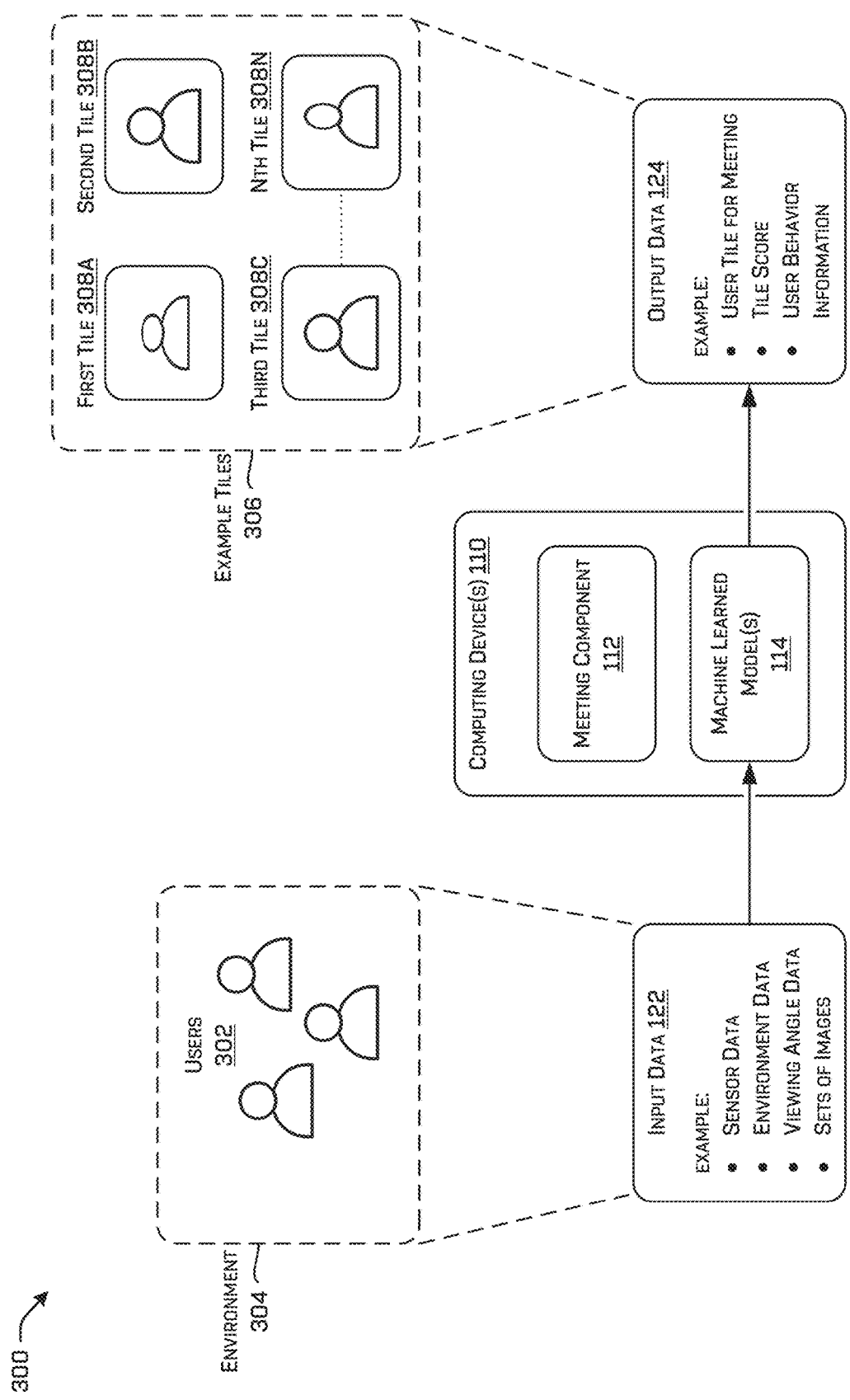
FIG. 3 illustrates a diagram of an example service provider network implementing an example machine learned model for determining a representation of a meeting participant.

FIG. 3 illustrates a diagram 300 of an example service provider network implementing an example machine learned model for determining a representation of a meeting participant. For example, the machine learned model(s) 114 of FIG. 1 can receive input data 122 representing users 302 in an environment 304 (e.g., a conference room or other physical location). The users 302 can represent the first users 106 at a first location 214 and/or the second user and additional users at the second location 220.

The input data 122 can include image data from one or more sensors in the environment 304 (e.g., the first location 214 and/or the second location 220). The image data can represent an image or a set of images having a single user or multiple users. In some examples, the machine learned model(s) 114 can generate the output data 124 representing example tiles 306 for each of the users 302 in the environment 304. The example tiles 306 can include a first tile 308A associated with a first user, a second tile 308B associated with a second user, a third tile 308C associated with a third user . . . , up to an Nth tile 308N, where N is an integer greater than 1, depending on a number of users in the environment. By including a tile for each user, the meeting component 112 can determine whether or not to output the tile, or modify the tile (e.g., arrange the tile, modify the tile, etc.) for presentation to achieve a desired effect on the users 302 collectively.

FIG. 3 depicts the first tile 308A having a first viewing angle (e.g., a bird-eye perspective), the second tile 308B and the third tile 308C having a second viewing angle (e.g., a substantially front view), and the Nth tile 308N is shown having a third viewing angle (e.g., a partial side view) (collectively referred to as "the tiles 308"). In various examples, the machine learned model(s) 114 can select an image (having a particular viewing angle) from a set of images having a variety of viewing angles for a same user. Thus, the first tile 308A can include an image that is selected based on the machine learned model determining which of the available images (either alone or in combination with another image of another user) is most likely to capture the attention of the other users in the environment 304. Though discussed in the context of viewing angle in the present example, other characteristics of an image can also or instead be used to select user images. For instance, image quality, color, size, resolution, focus, sharpness, compression ration or other characteristics can be evaluated to determine a score indicating a level of emotiveness or attention of the user. In various examples, a viewing angle and/or other characteristics discussed herein can also or instead be associated with a tile and the characteristics can be considered during tile arrangement or selection (e.g., using the characteristics of the tile by a model to determine whether or not to include a tile in an arrangement, or how to arrange a size or appearance of the tile relative to another tile). In examples having an image or tile that would otherwise not be used or selected due to a characteristic being below a quality threshold, a model can replace the image or the tile to improve the overall image or tile quality (e.g., a tile can be replaced by an image having better quality than the tile).

In some examples, the tiles 308 can be generated to include visual information and/or audio information absent from the sensor data to enhance a tile relative to another tile. For example, the machine learned model can alter a generated tile and/or generate a tile to change a size or an appearance relative to the size or appearance of the images represented by the input data 122.

Figure 4:
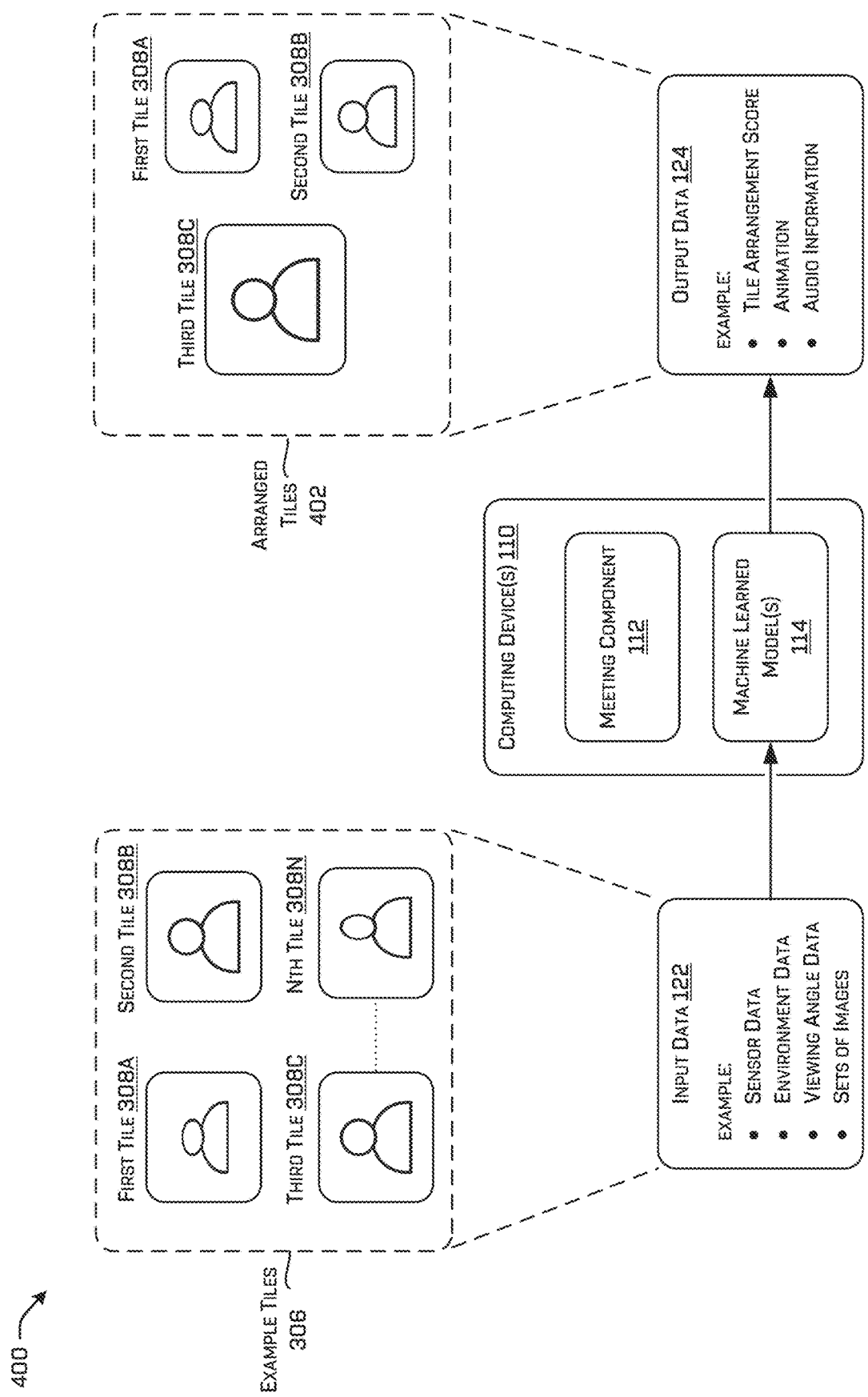
FIG. 4 illustrates a diagram of an example service provider network implementing an example machine learned model for determining an arrangement of user representations for presentation as part of a meeting.

FIG. 4 illustrates a diagram 400 of an example service provider network implementing an example machine learned model for determining an arrangement of user representations for presentation as part of a meeting. For example, the machine learned model(s) 114 of FIG. 1 can receive the tiles 308 representing users 302 in the environment 304 as the input data 122 for determining the output data 124 representing arranged tiles 402. The arranged tiles 402 can be configured for output on a display device of a client device associated with a user such that a unique arrangement of tiles is generated for each of the users 302.

In some examples, the machine learned model(s) 114 can arrange the tiles 308 based at least in part on the scoring component 212 determining a score for each tile and/or a score for the arrangement of tiles. A score can indicate a predicted level of emotion or attention when viewed by a user for a tile or the arranged tiles 402. The tile score can be based on presence of a particular emotion of a user (which may be indicated by a score determined for a user or users in an image or tile. Scores for tiles or arranged tiles can be compared to a score threshold, or one to another, to identify a tile or tile arrangement likely to have the greatest affect on users during presentation.

As mentioned, arranging the tiles 308 can include determining a size, shape, appearance, etc. for each tile in a window output on a display device. Arranging the tiles 308 can also include supplementing the existing sensor data with additional video, image, or audio data that brings attention to a user. For example, the machine learned model(s) 114 can determine that adding additional visual and/or audial content not captured by the sensor(s) to a tile, or an arrangement of tiles. In various examples, a change to an appearance or audio output of the tile can include changing a size, color, position, and so on of a background and/or a user in a tile.

By way of example and not limitation, a first machine learned model can receive sensor data associated with one or more meeting locations and determine tile for users, presence of emotions and/or a level of attention for users in the locations. Determinations from the first machine learned model can be input into a second machine learned model that arranges the tiles 308 substantially in real-time before and/or during the meeting. The second machine learned model can optionally receive input from another machine learned model that determines a current speaker in order to determine the arranged tiles 402. In examples when emotion or attention of a user decreases over time, the second machine learned model can be employed to alter tiles, receive a new tile for a new time, or otherwise identify changes to content that will increase attention of the users overall.

In some examples, the machine learned model(s) 114 can generate the arranged tiles 402 for presentation relative to an object in the physical environment (e.g., a table, etc.) such that the arranged tiles 402 are positioned relative to the object. The arranged tiles 402 can, for instance, include a representation of a table that is in a conference room as well as a position around the table for each user, including a remote user(s). Thus, in some examples, the machine learned model(s) 114 can determine the output data 124 to include a representation of one or more objects in one or more locations (e.g., an object(s) in the first location 214 and/or an object(s) in the second location 220).

The output data 124 can, in some examples, include position data identifying a position of each user in the first location, as well as having position information for an area in the first location for presenting a representation of one or more remote user. For example, the arranged tiles 402 can include positions for each tile that are based on the corresponding positions for the users in the first location. The first location can include different areas (e.g., a seat at a table, an area next to another person that is not occupied by an object or person in the first location, and the like) for including representations the remote user(s) on various devices, speakers, and so on. In various examples, the meeting component 112 can generate meeting data (e.g., the meeting data 116) that arranges representations of the meeting participants based on a physical location having an area to output a representation of a remote user.

Figure 9:
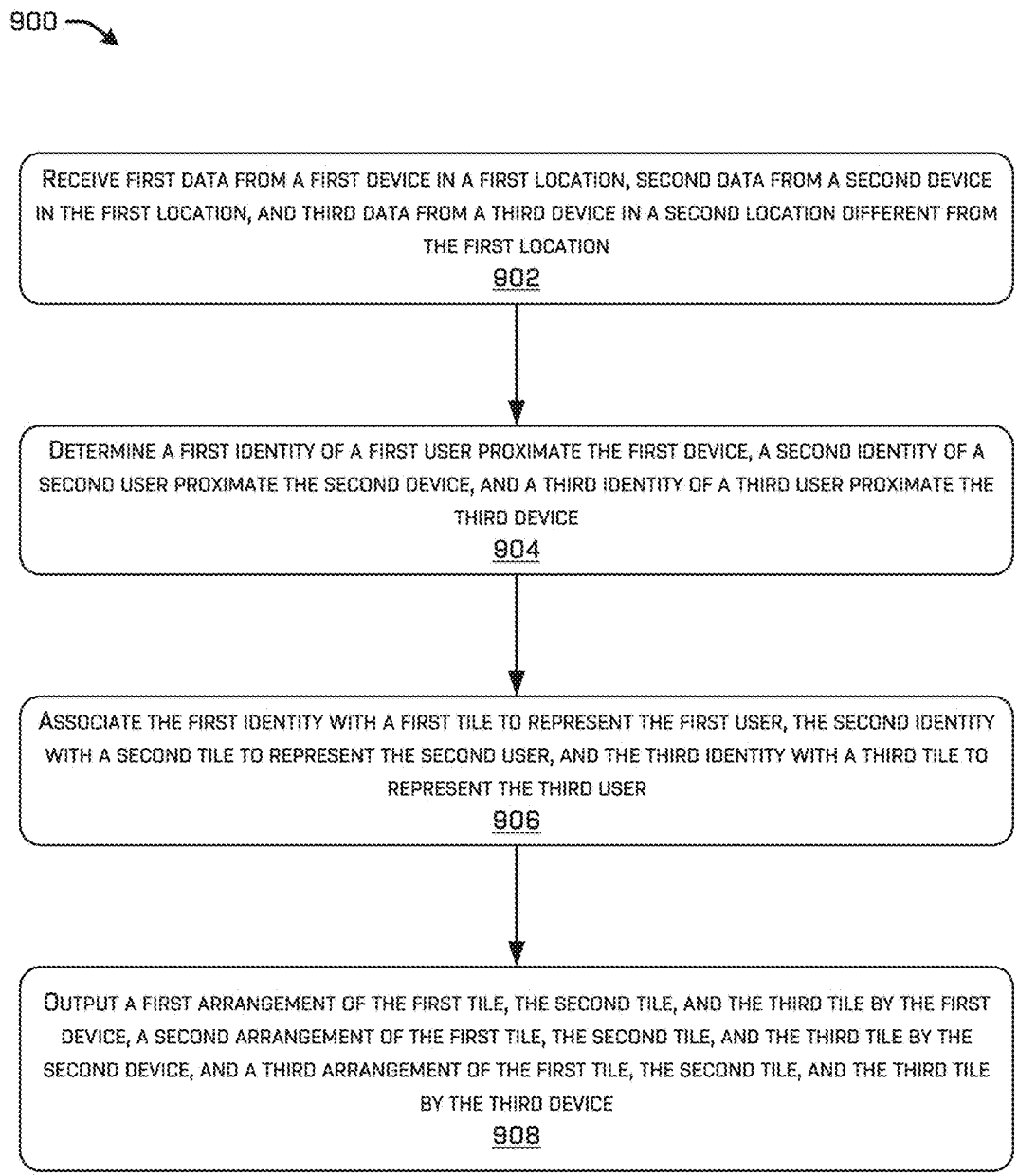
FIG. 9 is a flow diagram of an example method for outputting different tile arrangements by different examples devices.

FIGS. 5A, 5B, and 9 illustrate flow diagrams of example method 500 that illustrate aspects of the functions performed at least partly by the service provider network 102 as described in relation to FIG. 1 and elsewhere. The logical operations described herein with respect to FIGS. 5A, 5B, and 9 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5A, 5B, and 9 as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

In some examples, the techniques of method 500 and/or the method 900 may be performed by a system comprising one or more processors and one or more computer-readable media storing computer-executable instructions that, when executed by the one or more processors, cause the one or more processors to perform the operations of the methods.

FIG. 5A is a first part of a flow diagram of an example method 500 for determining a tile to represent a user in a meeting. For example, the service provider network 102 can provide a conference service (e.g., the service 108) and facilitate the exchanging of data between computing devices associated with different participants of the meeting. The service provider network 102 can implement the meeting component 112 and/or the model component 202, and functionality associated with the meeting component 112 or the model component 202 can be included in or otherwise provided by the other of the meeting component 112 or the model component 202.

At 502, a service provider network may receive first sensor data from a first sensor in a first environment and second sensor data from a second sensor in a second environment that is remote from the first environment. For instance, the meeting component 112 can receive sensor data from sensors in different physical geographical locations (e.g., the first location 214 and the second location 220). The first sensor data and/or the second sensor data can represent image data, audio data, or a combination thereof. One or more users may be present at each location to attend a meeting, for example. The first sensor and/or the second sensor can be fixedly coupled (e.g., a sensor that remains at a fixed position) in the environment, or in other examples movable coupled to the environment (e.g., a sensor that is capable of changing positions in the environment via instructions received from a remote computing device). In various examples, the meeting component 112 can receive other data in addition to the first and second sensor data such as other input data (e.g., the input data 122).

At 504, the model component 202 associated with the service provider network 102 may detect, based on the first sensor data, a first user in the first environment.

At 506, the model component 202 associated with the service provider network 102 may detect, based on the second sensor data, a second user in the second environment. The operations 504 and 506 can include, for example, the model component 202 classifying a first object in the first environment as a person and a second object in the second environment as a person.

At 508, the service provider network 102 may authorize the first user and the second user for entry into a meeting. For instance, the meeting component 112 can determine, verify, or validate an identity of the first user and the second user (and additional users in the first environment and/or the second environment) by comparing a known identity of users in user profiles previously provided by each user. The meeting component 112 can use another service and/or component of the service provider network 102 to authorize the detected users (or perform other functionality as described herein). In some examples, authorizing a user can include determining a customer account (if applicable), validating a user, validating security credentials, and the like.

At 510, the service provider network 102 may assign, based on the authorizing, a first meeting identifier for use by a first device associated with the first user and a second meeting identifier for use by a second device associated with the second user. For instance, the meeting component 112 can assign a meeting identifier for each user in each environment to enable the user to enter the meeting. The meeting identifier can represent a link, a QR code, a hash, a key, a credential, an RFID, or other value that uniquely identifies the user or participant in the environments and is usable for access to a communication channel associated with the meeting. In some examples, the meeting component 112 can initiate determining a voice profile and/or detecting facial expressions based at least in part on the first sensor data or the second sensor data. A user can, for example, enter a room or location, and the meeting component 112 can automatically initiate generation of voice, facial recognition, position, orientation, or other data usable for understanding behavior of a particular user.

In various examples, one or more of operations 502, 504, 506, 508, and 510 can be performed without having a user explicitly provide input indicating to enter the meeting. In other words, the model component 202 can receive sensor data responsive to a user entering an environment and initiate the detecting, authorizing, and assigning responsive to receiving the sensor data, for example. The service provider network 102 can passively detect users to provide content and information automatically to improve a user experience.

FIG. 5B is a second part of a flow diagram of an example method 500 for determining a tile to represent a user in a meeting.

At 512, the service provider network 102 may configure, by a machine learned model, a first tile to represent the first user and a second tile to represent the second user. For example, the model component 202 can implement one or more of the models 222 to generate a tile comprising a two-dimensional representation for each of the users in the meeting.

In some examples, configuring the first tile and the second tile comprises: at 514, inputting, into the machine learned model, a first set of images that depicts the first user and a second set of images that depicts the second user. For example, the machine learned model can receive the first sensor data and the second sensor data as input that represents image frames captured by a respective sensor. In some examples, the first environment and the second environment can include additional sensors. Regardless of the number of sensors, the first or second sensor data can represent image data (e.g., image frames from different perspectives and/or times) for evaluation by the machine learned model. In some examples, the machine learned model can receive processed sensor data (as opposed to raw sensor data) to achieve a desired input frame size for processing that efficiently utilizes available computational resources (processor(s), memor(ies), etc.).

In some examples, configuring the first tile and the second tile comprises: at 516, selecting a first image from the first set of images based on a first viewing angle associated with each image in the first set of images, and at 518 selecting a second image from the second set of images based on a second viewing angle (or some other criteria) associated with each image in the second set of images. The operations 516 and 518 can include, for example, the model component 202 assigning a score to each image (or user therein) indicating an emotional response of the respective user, and selecting an image from a set of images based on the scores associated with each image in the set of images. Although this example discusses a viewing angle for selecting an image, as noted herein, an image can be selected based on other criteria, such as an attribute of the user (e.g., an emotion evoked by a user in the image), image quality, level of interest of the image as a whole (user and background, image quality, and the like), or a combination thereof. A machine learned model can be trained to identify an image from among available images that evokes a pred-determined emotion. For example, the score can represent a classification or whether or not the user exhibits a particular emotion(s) such that a higher score shows the user having a better correlation to an expected emotion (one related to attention, for example). In this way, the machine learned model can predict which images are more likely to cause an audience to pay more attention relative to another image.

In some examples, configuring the first tile and the second tile comprises: at 520, including the first image as a first portion of the first tile and the second image as a second portion of the second tile, the first tile further including a first name of the first user and the second tile further including a second name of the second user. The machine learned model can output a tile representing a window for output on a display that includes the selected image to represent the user.

In various examples, the selected image can be modified for output on a display device by changing a size, appearance, or other detail of the image for inclusion in the tile. In some examples, a size of the tile can change over time relative to other tiles, or cease temporarily from being displayed, or be animated with visual and audio cues to enhance awareness of the tile relative to another tile. The tile can further include a name to identify the user to others when presented.

At 522, the meeting component 112 may send, to the first device associated with the first user, the first meeting identifier, the first tile, and the second tile. At 524, the meeting component 112 may send, to the second device associated with the second user, the second meeting identifier, the first tile, and the second tile. The connection component 204 can, for example, transmit meeting data (e.g., the meeting data 116), which can include a meeting identifier and tiles for display to a specific user, to respective devices associated with each user (e.g., the client device(s) 104 and the client device(s) 216).

At 526, the meeting component 112 may cause the first device to output the first tile and the second tile for display on a first display associated with the first device and the second device to output the first tile and the second tile for display on a second display associated with the second device. For example, based on the connection component 204 sending the meeting data, the tiles can be output for display automatically on the display device associated with the client device.

FIG. 6 illustrates a system and network diagram 600 of an example operating environment that includes a service provider network (that may be part of or associated with a cloud-based service network/platform) for implementing the techniques described herein. The service provider network 102 can include an API gateway 602 may receive an API call and route the API call to a component or service. In various examples, the service provider network 102 can include the meeting component 112 which comprises the connection component 204, the security component 206, the profile component 208, the user interface 210, and the scoring component 212.

The service provider network 102 can provide computing resources 606, like VM instances, containers, serverless functions, storage, etc., on a permanent or an as-needed basis. Among other types of functionality, the computing resources 606 provided by the service provider network 102 may be utilized to implement the various cloud-based services. The computing resources provided by the service provider network 102 can include various types of computing resources, such as data processing resources like VM instances, data storage resources, networking resources, data communication resources, application-container/hosting services, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. As shown, the service provider network 102 can include a database 608 for use in association with the meeting management techniques discussed herein. The service provider network 102 can also be configured to provide other types of computing resources not mentioned specifically herein.

The computing resources 606 provided by the service provider network 102 may be enabled in one example by one or more data centers 604A-604N (which might be referred to herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative example for a data center 604 that can be utilized to implement the technologies disclosed herein will be described below with regard to FIG. 7.

The data centers 604 may be configured in different arrangements depending on the service provider network 102. For example, one or more data centers 604 may be included in or otherwise make-up an availability zone. Further, one or more availability zones may make-up or be included in a region. Thus, the service provider network 102 may comprise one or more availability zones, one or more regions, and so forth. The regions may be based on geographic areas, such as being located within a predetermined geographic perimeter.

The users and/or admins of the service provider network 102 may access the computing resources 606 provided by the data centers 604 of the service provider network 102 over any wired and/or wireless network(s) 118 (utilizing a client device 104 and/or another accessing-user device), which can be a wide area communication network ("WAN"), such as the Internet, an intranet or an Internet service provider ("ISP") network or a combination of such networks. For example, and without limitation, a device operated by a user of the service provider network 102 may be utilized to access the service provider network 102 by way of the network(s) 118. It should be appreciated that a local-area network ("LAN"), the Internet, or any other networking topology known in the art that connects the data centers 604 to remote clients and other users can be utilized. It should also be appreciated that combinations of such networks can also be utilized.

In a distributed computing environment, such as the one included in the service provider network 102 (e.g., computing-resource network), a fleet of VM instances and/or servers may have workflow or processes executed thereon to manage resources. For instance, a patch may need to be installed on each VM instance and/or resource at a particular time. In such distributed applications of workflows or processes, a load balancer may be at the front end in front of the fleet of servers where a request for a workflow comes in, and the load balancer distributes the request to execute the workflow amongst the servers.

Figure 7:
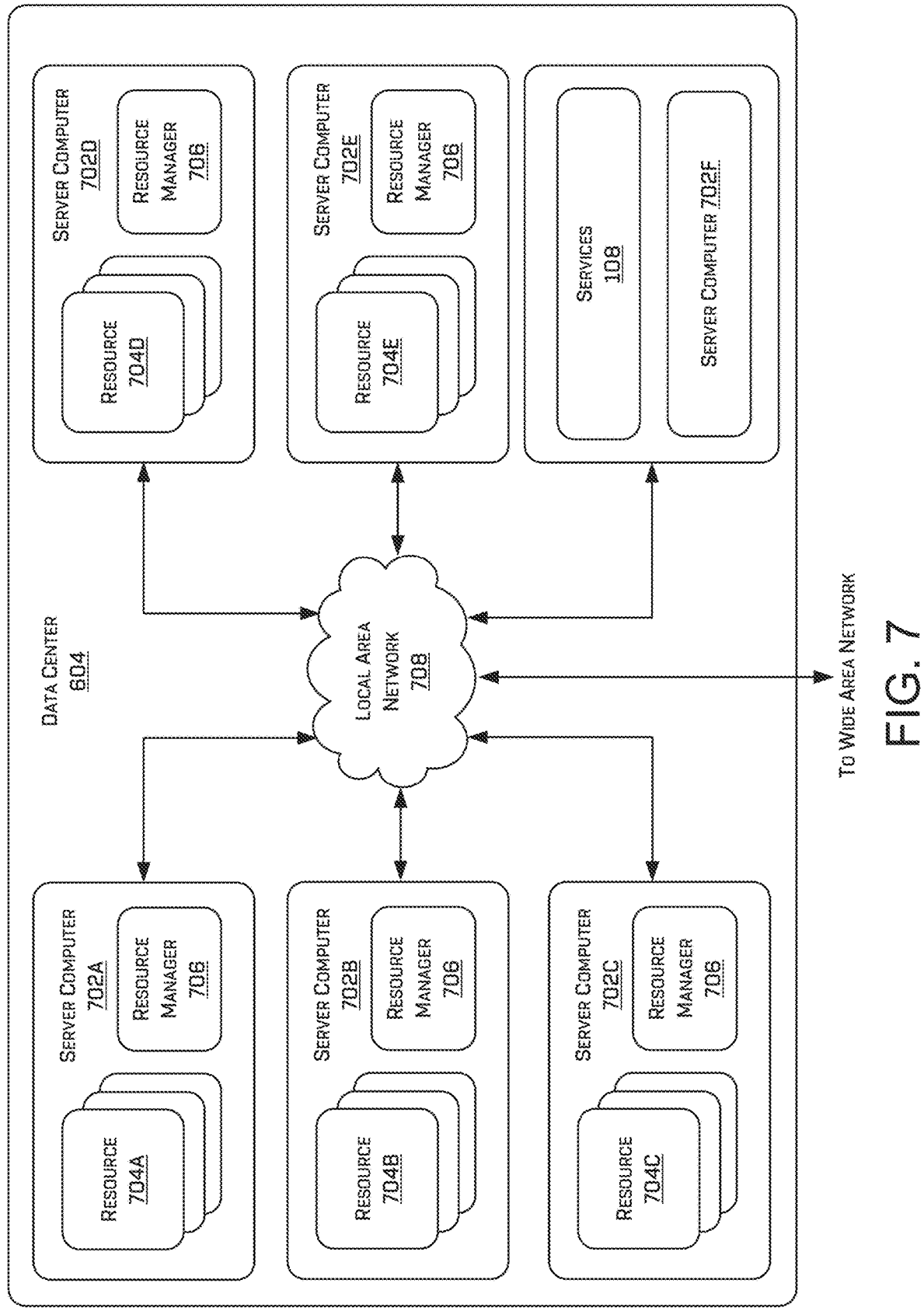
FIG. 7 illustrates a computing system diagram illustrating a configuration for a data center that can be utilized to implement aspects of the techniques disclosed herein.

FIG. 7 illustrates a computing system diagram illustrating a configuration for a data center that can be utilized to implement the techniques disclosed herein. The example data center 604 shown in FIG. 7 includes several server computers 702A-702F (which might be referred to herein singularly as "a server computer 702" or in the plural as "the server computers 702") for providing computing resources 704A, 704B, 704C, 704D, and 704E. In some examples, the resources 704 may include, or correspond to, resources associated with the meeting component 112 or a model or component associated therewith.

The server computers 702 can be standard tower, rack-mount, or blade server computers configured appropriately for providing the computing resources described herein (illustrated in FIG. 7 as the computing resources 704A-704E). As mentioned above, the computing resources provided by the service provider network 102 can be data processing resources such as VM instances or hardware computing systems, database clusters, computing clusters, storage clusters, data storage resources, database resources, networking resources, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 604 can also be configured to provide network services and other types of services, some of which are described in detail below with regard to FIG. 8.

The data center 604 shown in FIG. 7 also includes a server computer 702F that can execute some or all of the software components described above. For example, and without limitation, the server computer 702F can be configured to execute components of the service provider network 102, including the services 108.

In the example data center 604 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 604A-604N, between each of the server computers 702A-702F in each data center 604, and, potentially, between computing resources in each of the server computers 702. It should be appreciated that the configuration of the data center 604 described with reference to FIG. 7 is merely illustrative and that other implementations can be utilized.

Figure 8:
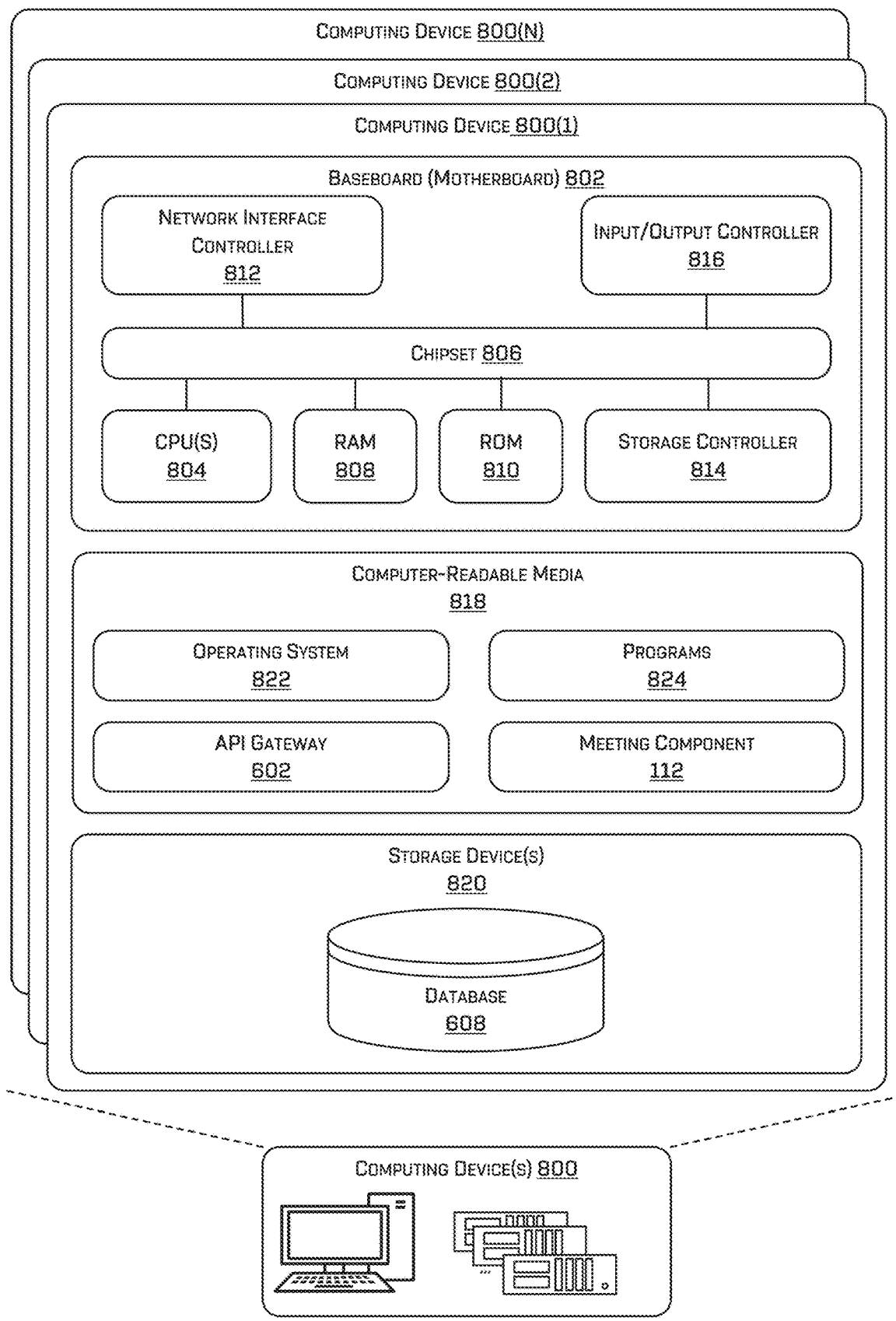
FIG. 8 is a computer architecture diagram showing an illustrative computer hardware architecture for implementing a computing device that can be utilized to implement aspects of the techniques disclosed herein.

FIG. 8 is a computer architecture diagram showing an illustrative computer hardware architecture for implementing one or more computing devices 800 that can be utilized to implement the techniques disclosed herein. The computer architecture shown in FIG. 8 illustrates a conventional server computer, workstation, desktop computer, laptop, tablet, network appliance, e-reader, smartphone, or other computing device, and can be utilized to execute any of the software components presented herein.

The computing device 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computing device 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computing device 800. The chipset 806 can further provide an interface to a computer-readable storage medium such as a read-only memory ("ROM") 810 or non-volatile RAM ("NVRAM") for storing basic routines that help to startup the computing device 800 and to transfer information between the various components and devices. The ROM 810 or NVRAM can also store other software components necessary for the operation of the computing device 800 in accordance with the configurations described herein.

The computing device 800 can operate in a networked environment using logical connections to remote computing devices and computer systems through a network, such as the network 118. The chipset 806 can include functionality for providing network connectivity through a network interface controller (NIC 812), such as a gigabit Ethernet adapter. The NIC 812 is capable of connecting the computing devices 800 over the network 118. It should be appreciated that multiple NICs 812 can be present in the computing device 800, connecting the computer to other types of networks and remote computer systems.

The computing device 800 can be connected to one or more computer-readable media 818 storing software components for the computer device 800, and one or more mass storage devices 820 for storing data. The computer-readable storage media 818 can store an operating system 822, programs 824, the API gateway 602, and the meeting component 112, which have been described in greater detail herein. The mass storage device 820 can be connected to the computing device 800 through a storage controller 814 connected to the chipset 806. The mass storage device 820 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

Generally, the computer-readable storage media 818 may store the components described herein as executable, computer-readable instructions. For instance, the components may include the API gateway 602, the meeting component 112, or components associated with the meeting component 112. The components may be stored and/or executed on a single server, or on a system of two or more computing devices 800.

The computing device 800 can store data on the mass storage device 820 by transforming the physical state of the physical storage units to reflect the information being stored. The specific transformation of physical state can depend on various factors, in different examples of this description. Examples of such factors can include, but are not limited to, the technology used to implement the physical storage units, whether the mass storage device 820 is characterized as primary or secondary storage, and the like.

For example, the computing device 800 can store information to the mass storage device 820 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 can further read information from the mass storage device 820 by detecting the physical states or characteristics of one or more particular locations within the physical storage units.

In addition to the mass storage device 820 described above, the computing device 800 can have access to the computer-readable storage media 818 to store and retrieve information, such as program modules, event structures, or other data. It should be appreciated by those skilled in the art that computer-readable storage media is any available media that provides for the non-transitory storage of data and that can be accessed by the computing device 800. In some examples, the operations performed by the service provider network 102, and or any components included therein, may be supported by one or more devices similar to computing device 800. Stated otherwise, some or all of the operations performed by the service provider network 102, and or any components included therein, may be performed by one or more computer devices 800 operating in a cloud-based arrangement. As shown, the storage device 820 may store the database 608 that includes information about meeting data, sensor data, user profiles, and services as well as rules and access policies.

By way of example, and not limitation, computer-readable storage media 818 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disc ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 820 can store an operating system 822 utilized to control the operation of the computing device 800. According to one example, the operating system comprises the LINUX operating system. According to another example, the operating system comprises the WINDOWS®: SERVER operating system from MICROSOFT Corporation of Redmond, Washington. According to further examples, the operating system can comprise the UNIX operating system or one of its variants. It should be appreciated that other operating systems can also be utilized. The mass storage device 820 can store other system or application programs and data utilized by the computing device 800.

In one example, the mass storage device 820 or other computer-readable storage media 818 is encoded with computer-executable instructions which, when loaded into the computing device 800, transform the computer from a general-purpose computing system into a special-purpose computer capable of implementing the examples described herein. These computer-executable instructions transform the computing device 800 by specifying how the CPUs 804 transition between states, as described above. According to one example, the computing device 800 has access to computer-readable storage media storing computer-executable instructions which, when executed by the computing device 800, perform the various processes described above with regard to FIGS. 1-7. The computing device 800 can also include computer-readable storage media having instructions stored thereupon for performing any of the other computer-implemented operations described herein.

The computing device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computing device 800 might not include all of the components shown in FIG. 8, can include other components that are not explicitly shown in FIG. 8, or might utilize an architecture completely different than that shown in FIG. 8.

In various examples, the service provider network may be part of or associated with a cloud-based service network that can be configured to implement aspects of the functionality described herein.

The service provider network 102 can provide computing resources, like physical servers, VM instances, containers, serverless functions, network functions, and storage, on a permanent or an as-needed basis. Among other types of functionality, the computing resources provided by the service provider network 102 may be utilized to implement the various services described above. The computing resources provided by the service provider network 102 can include various types of computing resources, such as data processing resources like VM instances, data storage resources, networking resources, data communication resources, application-container/hosting services, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 604 (which might be referred to herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 can also be located in geographically disparate locations.

FIG. 9 is a flow diagram of an example method 900 for outputting different tile arrangements by different examples devices. For example, the service provider network 102 can provide a conference service (e.g., the service 108) and facilitate the exchanging of data between computing devices associated with different participants of the meeting. The service provider network 102 can implement the meeting component 112 and/or the model component 202, and functionality associated with the meeting component 112 or the model component 202 can be included in or otherwise provided by the other of the meeting component 112 or the model component 202.

At 902, a service provider network may receive first data from a first device in a first location, second data from a second device in the first location, and third data from a third device in a second location different from the first location. For instance, the meeting component 112 can receive sensor data from sensors (e.g., from a camera, a microphone, etc.) in different physical geographical locations the first location 214 and the second location 220). The first data and/or the second data can represent image data, audio data, or a combination thereof. In various examples, the meeting component 112 can receive other data in addition to the first and second data such as other input data (e.g., the input data 122).

At 904, the model component 202 associated with the service provider network 102 may determine a first identity of a first user proximate the first device, a second identity of a second user proximate the second device, and a third identity of a third user proximate the third device. For instance, the profile component 208 can verify user credentials or use a key or other authentication technique to validate an identity of the first user, an identity of the second user, and an identity the third user. In some examples, the profile component 208 can determine an identity for a user using biometric and/or non-biometric techniques.

At 906, the model component 202 associated with the service provider network 102 may associate the first identity with a first tile to represent the first user, the second identity with a second tile to represent the second user, and the third identity with a third tile to represent the third user. For instance, each respective tile can be configured to include a text description identifying the respective user (e.g., a name, an alias, or other identity adjacent to or within a tile).

At 908, the service provider network 102 may output a first arrangement of the first tile, the second tile, and the third tile by the first device, a second arrangement of the first tile, the second tile, and the third tile by the second device, and a third arrangement of the first tile, the second tile, and the third tile by the third device. For instance, the meeting component 112 can determine an arrangement of tiles for each device associated with each user. In some examples, the meeting component 112 can generate first content for output in association with the first arrangement by the first device that is different from second content output in association with the third arrangement by the third device. In various examples, the first content and the second content can represent different audio content and/or video content to enable the first user and the third user to be presented with different arrangement of tiles (e.g., audio from different sources, video in a tile shown relative to another tile and/or a position of a user in the first location, etc.).

Figure 10:
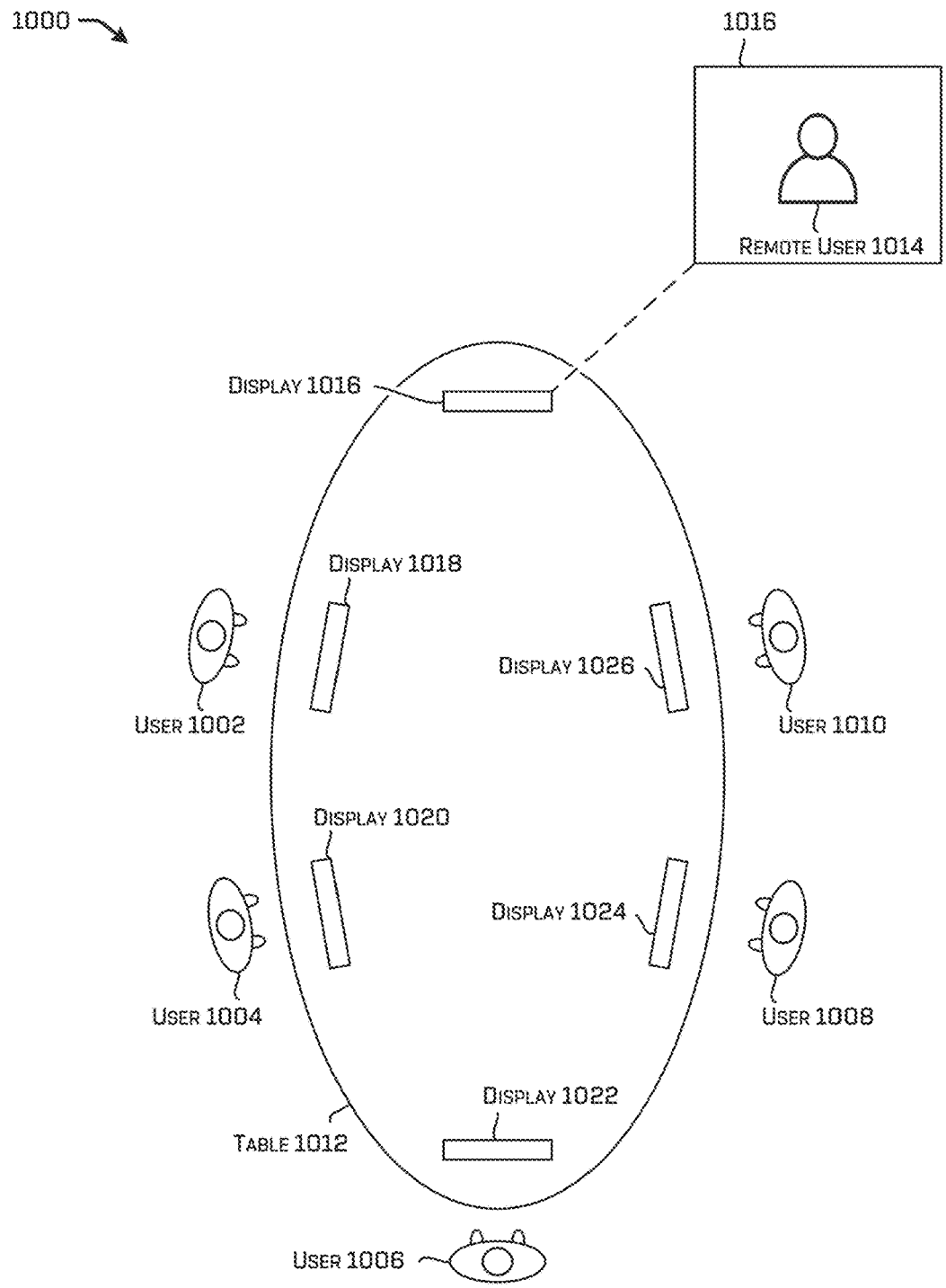
FIG. 10 illustrates an example environment in which an example equipment represents a remote user at a table with other users.

FIG. 10 illustrates an example environment in which an example equipment represents a remote user at a table with other users. For example, the service provider network 102 can provide a conference service (e.g., the service 108) and facilitate the exchanging of data between computing devices associated with different participants of the meeting. In various examples, the service provider network 102 can implement the meeting component 112 and/or the model component 202.

FIG. 10 depicts a user 1002, a user 1004, a user 1006, a user 1008, and a user 1010 adjacent a table 1012 in the environment 1000 (e.g., a conference room), though in other examples a different number of users or participants may be present in the environment 1000. As illustrated in FIG. 10, a remote user 1014 is shown on a display 1016 at a head of the table 1012, although the display 1016 may be disposed at any location on or around the table 1012. The user 1002 is associated with a display 1018, the user 1004 is associated with a display 1020, a user 1006 is associated with a display 1022, a user 1008 is associated with a display 1024, and a user 1010 is associated with a display 1026. The display 1016, the display 1018, the display 1020, the display 1022, the display 1024, and the display 1026 (referred collectively as "the displays") can represent a computing device, a display device, and the like, for representing a respective user in the environment 1000 including the remote user 1014 have "a seat" or area reserved at the table 1012 with a dedicated display (e.g., the display 1016).

In some examples, the meeting component 112 and/or the model component 202 can cause one of the displays to present content that is unique relative to another display. In some examples, each of the displays can present different content based on a perspective of where a user is physically located in the environment 1000. A representation of the remote user 1014 can be included on each of the displays, and be consistent with the seating positions, viewing angles, perspectives, etc. for each respective position.

In various examples, the remote user 1014 can include a computing device located in a remote location with the remote user. In this way, the meeting component 112 and/or the model component 202 can cause data to be output for presentation to the remote user 1014 (from the perspective of being at the table 1012), as well as tiles for each the users (e.g., the user 1002, the user 1004, the user 1006, and the user 1008).

While shown in the context of the table 1012, the environment 1000 may not include a table (e.g., the users may be standing in a large room, or in an outdoor space, or the like) and/or may include a different object around which various users meet. As mentioned, a different number of users can be included in the environment 1000 and in such examples, a display can be included for each user physically located in the environment, and a display for each remote user participating in the meeting. Thus, while shown with a single remote user, other remote users can be included at various locations around the table 1012, or multiple remote users may be shown via the display 1016.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

What is claimed is:

1. A system comprising:
   one or more processors; and
   one or more non-transitory computer-readable media storing instructions executable by the one or more processors, wherein the instructions, when executed, cause the one or more processors to perform operations comprising:
   receiving first sensor data from a first sensor in a first environment and second sensor data from a second sensor in a second environment that is remote from the first environment;
   detecting, based on the first sensor data, a first user in the first environment:
   detecting, based on the second sensor data, a second user in the second environment;
   authorizing the first user and the second user for entry into a meeting:
   assigning, based on the authorizing, a first meeting identifier for use by a first device associated with the first user and a second meeting identifier for use by a second device associated with the second user;
   configuring, by a machine learned model, a first tile to represent the first user and a second tile to represent the second user, wherein configuring the first tile and the second tile comprises:
   inputting, into the machine learned model, a first set of images that depicts the first user and a second set of images that depicts the second user:
   selecting a first image from the first set of images based on a first viewing angle associated with each image in the first set of images:

selecting a second image from the second set of images based on a second viewing angle associated with each image in the second set of images; and including the first image as a first portion of the first tile and the second image as a second portion of the second tile, the first tile further including a first text description of the first user and the second tile further including a second text description of the second user;

sending, to the first device associated with the first user, the first meeting identifier, the first tile, and the second tile;

sending, to the second device associated with the second user, the second meeting identifier, the first tile, and the second tile; and causing the first device to output the first tile and the second tile for display on a first display associated with the first device and causing the second device to output the first tile and the second tile for display on a second display associated with the second device.

2. The system of claim 1, wherein the machine learned model is a first machine learned model, and the operations further comprising:

inputting, into a second machine learned model, the first sensor data, the second sensor data, the first tile, and the second tile;

determining, by the second machine learned model, a first score indicating a first emotional state or a first level of engagement of the first user in the first tile and a second score indicating a second emotional state or a second level of engagement of the second user in the second tile;

at least one of:
comparing, as a first comparison, the first score to the second score; or
comparing, as a second comparison, the first score and the second score to an attention threshold value; and determining, by the second machine learned model and based on the first comparison or the second comparison, arrangement data representing a first size and a first position of the first tile for display and a second size and a second position of the second tile for display.

3. The system of claim 2, the operations further comprising:

sending the arrangement data to the first device and the second device, wherein causing the first device and the second device to output the first tile and the second tile for display comprises causing the first tile to be displayed relative to the second tile based on the arrangement data.

4. The system of claim 1, wherein the machine learned model is a first machine learned model, and the operations further comprising:

inputting, into a second machine learned model, the first sensor data and the second sensor data;

determining, by the second machine learned model, speaker data identifying a current speaker from among the first user, the second user, or a third user in the first environment or the second environment; and at least one of:
sending the speaker data to the first machine learned model for configuring the first tile or the second tile; or
determining arrangement data for arranging the first tile relative to the second tile via the first display or the second display.

5. The system of claim 4, wherein determining the speaker data by the second machine learned model is based on at least one of:

applying a mouth movement detection algorithm to determine an amount of mouth movement by the first user, the second user, or the third user: or applying an audio amplitude analysis algorithm to determine a peak amplitude of audio associated with the first user, the second user, or the third user.

6. The system of claim 1, wherein causing the first device and the second device to output the first tile and the second tile is performed automatically, without input from the first user or the second user, and responsive to configuring the first tile and the second tile.

7. A computer-implemented method comprising:

detecting, based at least in part on first sensor data from a first sensor, a first user in a first environment;

detecting, based at least in part on second sensor data from a second sensor, a second user in a second environment remote from the first environment;

determining a first meeting identifier for use by a first device associated with the first user and a second meeting identifier for use by a second device associated with the second user;

configuring, by a machine learned model, a first tile to represent the first user and a second tile to represent the second user, wherein configuring the first tile and the second tile comprises:

inputting, into the machine learned model, a first set of images that depicts the first user and a second set of images that depicts the second user;

selecting a first image from the first set of image frames based at least in part on a first criteria;

selecting a second image from the second set of image frames based at least in part on second criteria; and including the first image as a first portion of the first tile and the second image as a second portion of the second tile;

sending, to the first device, the first meeting identifier, the first tile, and the second tile;

sending, to the second device, the second meeting identifier, the first tile, and the second tile; and causing the first device to output the first tile and the second tile for display on a first display associated with the first device and the second device to output the first tile and the second tile for display on a second display associated with the second device.

8. The computer-implemented method of claim 7, wherein the machine learned model is a first machine learned model, and further comprising:

inputting, into a second machine learned model, the first sensor data, the second sensor data, the first tile, and the second tile;

determining, by the second machine learned model, a first score indicating a first emotional state or a first level of engagement of the first user in the first tile and a second score indicating a second emotional state or a second level of engagement of the second user in the second tile;

at least one of:
comparing, as a first comparison, the first score to the second score: or
comparing, as a second comparison, the first score and the second score to an attention threshold value; and determining, by the second machine learned model and based at least in part on the first comparison or the second comparison, arrangement data representing a first size and a first position of the first tile for display and a second size and a second position of the second tile for display.

9. The computer-implemented method of claim 8, further comprising:
sending the arrangement data to the first device and the second device,
wherein causing the first device and the second device to output the first tile and the second tile for display comprises causing the first tile to be displayed relative to the second tile based at least in part on the arrangement data.

10. The computer-implemented method of claim 8, wherein determining the first score indicating the first emotional state or the first level of engagement of the first user in the first tile comprises:
analyzing posture or a facial expression of the first user in the first tile; and
determining the first emotional state or the first level of engagement of the first user based at least in part on the posture or the facial expression.

11. The computer-implemented method of claim 8, wherein:
determining the first score indicating the first emotional state or the first level of engagement of the first user in the first tile is based at least in part on the machine learned model applying a sentiment tracking algorithm that determines sentiment of the first user over a time period.

12. The computer-implemented method of claim 7, wherein the machine learned model is a first machine learned model, and further comprising:
inputting, into a second machine learned model, the first sensor data and the second sensor data;
determining, by the second machine learned model, speaker data identifying a current speaker from among the first user, the second user, or a third user in the first environment or the second environment; and
at least one of:
sending the speaker data to the first machine learned model for configuring the first tile or the second tile; or
determining arrangement data for arranging the first tile relative to the second tile via the first display or the second display.

13. The computer-implemented method of claim 12, wherein determining the speaker data by the second machine learned model is based at least in part on:
applying a mouth movement detection algorithm to determine an amount of mouth movement by the first user, the second user, or the third user: or
applying an audio amplitude analysis algorithm to determine a peak amplitude of audio associated with the first user, the second user, or the third user.

14. The computer-implemented method of claim 7, wherein the first sensor data is associated with a first time, and further comprising:
receiving third sensor data from the first sensor or the second sensor at a second time after the first time; and
determining, based at least in part on the third sensor data, a change in appearance or viewing angle of the first tile or the second tile.

15. The computer-implemented method of claim 7, further comprising:
determining a threshold number of tiles to output during a meeting; and
configuring the meeting to include the first tile, the second tile, and one or more additional tiles associated with additional users to output the threshold number of tiles.

16. The computer-implemented method of claim 7, further comprising:
authorizing a first identity of the first user and a second identity of the second user,
wherein:
configuring the first tile and the second tile is based at least in part on the authorizing,
the first tile includes a first name of the first user, and
the second tile includes a second name of the second user.

17. One or more non-transitory computer-readable media storing instructions that, when executed, cause one or more processors to perform operations comprising:
detecting, based at least in part on first sensor data from a first sensor, a first user in a first environment;
detecting, based at least in part on second sensor data from a second sensor, a second user in a second environment remote from the first environment;
determining a first meeting identifier for use by a first device associated with the first user and a second meeting identifier for use by a second device associated with the second user;
configuring, by a machine learned model, a first tile to represent the first user and a second tile to represent the second user, wherein configuring the first tile and the second tile comprises:
inputting, into the machine learned model, a first set of images that depicts the first user and a second set of images that depicts the second user;
selecting a first image from the first set of image frames based at least in part on a first criteria;
selecting a second image from the second set of image frames based at least in part on second criteria; and
including the first image as a first portion of the first tile and the second image as a second portion of the second tile;
sending, to the first device, the first meeting identifier, the first tile, and the second tile;
sending, to the second device, the second meeting identifier, the first tile, and the second tile; and
causing the first device to output the first tile and the second tile for display on a first display associated with the first device and the second device to output the first tile and the second tile for display on a second display associated with the second device.

18. The one or more non-transitory computer-readable media of claim 17, wherein the machine learned model is a first machine learned model, and the operations further comprising:
inputting, into a second machine learned model, the first sensor data, the second sensor data, the first tile, and the second tile;
determining, by the second machine learned model, a first score indicating a first emotional state or a first level of engagement of the first user in the first tile and a second score indicating a second emotional state or a second level of engagement of the second user in the second tile;
at least one of:
comparing, as a first comparison, the first score to the second score; or
comparing, as a second comparison, the first score and the second score to an attention threshold value; and determining, by the second machine learned model and based at least in part on the first comparison or the second comparison, arrangement data representing a first size and a first position of the first tile for display and a second size and a second position of the second tile for display.

19. The one or more non-transitory computer-readable media of claim 17, wherein the machine learned model is a first machine learned model, and the operations further comprising:
   inputting, into a second machine learned model, the first sensor data and the second sensor data;
   determining, by the second machine learned model, speaker data identifying a current speaker from among the first user, the second user, or a third user in the first environment or the second environment; and
   at least one of:
      sending the speaker data to the first machine learned model for configuring the first tile or the second tile; or
      determining arrangement data for arranging the first tile relative to the second tile via the first display or the second display.

20. The one or more non-transitory computer-readable media of claim 17, wherein causing the first device and the second device to output the first tile and the second tile is performed automatically, without input from the first user or the second user, and responsive to configuring the first tile and the second tile.

* * * * *